US008909584B2

(12) United States Patent
Junker

(10) Patent No.: US 8,909,584 B2
(45) Date of Patent: Dec. 9, 2014

(54) MINIMIZING RULE SETS IN A RULE MANAGEMENT SYSTEM

(75) Inventor: Ulrich M. Junker, Valbonne (FR)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 13/597,419

(22) Filed: Aug. 29, 2012

(65) Prior Publication Data

US 2013/0085977 A1    Apr. 4, 2013

(30) Foreign Application Priority Data

Sep. 29, 2011 (EP) ..................................... 11290448

(51) Int. Cl.
    *G06N 5/00* (2006.01)
    *G06F 1/00* (2006.01)
    *G06N 5/02* (2006.01)

(52) U.S. Cl.
    CPC ....................................... *G06N 5/025* (2013.01)
    USPC .............................. 706/47; 715/266; 709/223

(58) Field of Classification Search
    USPC ........................................................... 706/47
    See application file for complete search history.

(56) References Cited

U.S. PATENT DOCUMENTS

| | | | |
|---|---|---|---|
| 5,943,667 A | 8/1999 | Aggarwal et al. | |
| 7,152,075 B2 | 12/2006 | Vining et al. | |
| 7,337,230 B2 | 2/2008 | Zehavi | |
| 7,792,775 B2 | 9/2010 | Matsuda | |
| 2002/0049720 A1 | 4/2002 | Schmidt | |
| 2004/0030786 A1 | 2/2004 | Zehavi | |
| 2005/0278431 A1* | 12/2005 | Goldschmidt et al. | ........ 709/207 |
| 2006/0277601 A1 | 12/2006 | Gouda et al. | |
| 2008/0147584 A1* | 6/2008 | Buss | ................................ 706/47 |
| 2011/0082826 A1 | 4/2011 | Junker | |
| 2012/0158628 A1 | 6/2012 | Junker | |
| 2012/0317541 A1* | 12/2012 | Kaulgud et al. | .............. 717/102 |

FOREIGN PATENT DOCUMENTS

CN            1924908 A        3/2007

OTHER PUBLICATIONS

Junker, Ulrich, "Quick Xplain: Preferred Explanations and Relaxations for Over-Constrained Problems," Proceedings of the Association for the Advancement of Artificial Intelligence (AAAI), 2004, all pages.

International Search Report and Written Opinion for International Application No. PCT/IB2012/054966 dated Feb. 28, 2013.

* cited by examiner

*Primary Examiner* — Jeffrey A Gaffin
*Assistant Examiner* — Kalpana Bharadwaj
(74) *Attorney, Agent, or Firm* — Winstead, P.C.

(57) ABSTRACT

A method, system and computer program product for minimizing a rule set. A rule set application graph that describes a set of rules including actions and cases is built, whereby each rule defines an action for one or more cases. A rule violation graph for each rule describing the actions and cases not defined for that rule is built. A subset of rules having a reduced number of rules with the same set of actions and cases as the rule set application graph is determined by exploring candidate subsets of the rule set that are sufficient for reproducing the behavior of the original rule set.

19 Claims, 13 Drawing Sheets

MINIMIZING RULE SETS IN A RULE MANAGEMENT SYSTEM

CROSS-REFERENCE TO RELATED APPLICATIONS

This application claims priority under 35 U.S.C. §119(a) from European Patent Application No. 11290448.7, filed on Sep. 29, 2011, the contents of which are incorporated herein by reference.

TECHNICAL FIELD

The present invention relates generally to a rule management system, and more particularly, to minimizing rule sets in a rule management system.

BACKGROUND

Business Rule Management (BRM) technology relates to the area of decision-making automation in business problems, such as loan approval, insurance claim processing or customer loyalty programs. A Business Rule Management System (BRMS) is implemented to work with rule projects. A BRMS allows rule edition in a controlled natural-like language, which makes it easy to use without specific knowledge on generating rules. The rules can be kept in different versions in a rule repository. A BRMS further allows the execution of the rules by a rule engine, which also performs a rule analysis for detecting conflicting rules, redundant rules, and missing rules. Another feature is rule validation by test and simulation.

Business rules are a convenient way to represent decision making policies that are making decisions depending on given cases. A case usually consists of a combination of features and a decision may be a combination of elementary choices. A business rule makes a decision by applying an action to a given case. A business rule cannot handle all cases, but only those that satisfy a condition. A business rule thus consists of a condition, which usually is a combination of tests, and an action, which may consist of a sequence of elementary steps. As a business rule treats only certain cases, it defines only a part of the whole decision making process. Further business rules are needed to make a decision for the remaining cases. If the given business rules are making a decision for each relevant case, then such a collection of rules is complete. Otherwise, the rules will not treat every case and further rules need to be added to make the rules complete.

Decision automation for problems, such as insurance claim processing, loan approval, or discount calculation for shopping carts consists in making decisions for a huge number of cases in a consistent and predictable way. Decision automation is achieved through business policies comprising business rules, which map each possible case to a single decision. Business rules provide a convenient way to represent complex policies which make decisions for diverse and complex forms of cases. Each rule represents an independent part of the policy and makes a decision for a subset of the cases. A business rule consists of a condition describing the cases treated by the rule and an action which consists in making the decision for a case. As cases may be complex and consist of different objects (such as the different items in a shopping cart), a business rule may treat only selected objects of the case and thus has a scope describing the kinds of objects it may treat. A complex policy can thus be represented by a set of business rules in a simple way.

As there are numerous ways to represent a policy in terms of rules, additional criteria are necessary to determine good representations for decision automation. Firstly, it is important to keep the representation manageable and as small as possible. The number of rules can be reduced by making the rules as general as possible and by avoiding redundant rules. Secondly, different rules should be independent of each other in order to facilitate modification of rules due to a change of a business policy. If the business policy is changing for some cases, then the business user needs to adapt all rules treating this case to the new policy. If the rules are overlapping, then a policy change may require a modification of several rules. This overhead in rule editing is acceptable if the overlaps are due to the fact that the rules are as general as possible. However, it is not acceptable if there are redundant rules, which can be removed without changing the decision-making behavior of a rule set.

A manageable and agile representation of a business policy attempts to prohibit redundant rules. However, redundant rules are difficult to avoid if rules are automatically generated by rule learning and data mining tools or assembled from different sources, such as multiple rule authors. Due to the combinatorial nature of the rule conditions, there may be unforeseen interactions between rules, which lead to redundant rules even if the rules are written by a single author. For these reasons, existing business rule management and rule learning systems seek to eliminate redundancy by a dedicated rule analysis module.

Existing approaches for redundancy elimination differ in the form of redundancy that they are able to detect and in the form of rules that they are able to process. Most of these approaches consider simple forms of rules that make decisions for business problems involving a finite number of cases only. Those cases are characterized by a finite number of attributes over finite domains. As the number of those cases is finite, a redundancy analyzer can explore the set of treated cases of each rule. It can then compare these sets of treated cases for those rules that are making the same decision. Some redundancy analyzers limit this comparison to pairs of rules and determine whether a rule is made redundant by some other rule. For this purpose, such an analyzer checks whether all the treated cases of the examined rule are also treated by some other rule that makes the same decision. If yes, the analyzer notifies a local redundancy by stating that the first rule is made redundant by the other rule. Usually, such a local redundancy analyzer distinguishes between strict and simple redundancies. There is a simple redundancy between two rules if the two rules are equivalent, that is, make the same decision and treat exactly the same set of cases. A local analyzer may remove any of two equivalent rules to eliminate a simple redundancy. There is a strict redundancy between two rules if the second rule makes the first rule redundant, but the first rule does not make the second rule redundant. In order to eliminate a strict redundancy, the local redundancy analyzer will eliminate the redundant rule and not the other rule. This behavior is justified by the fact that the local redundancy analyzer has no knowledge of global redundancies.

A global redundancy analyzer seeks rules that are globally redundant, that is that can be removed from a rule set without changing the decision-making behavior of this rule set. A global redundancy analyzer detects a redundant rule if each of the treated cases of this rule is treated by some other rule in the rule set that makes the same decision as the examined rule. Locally redundant rules are also globally redundant, but the converse does not necessarily hold. For example, if the rules are mostly general conditions, then there are no locally redundant rules, but it may still be possible to remove some rules without changing the behavior of the rule set. It may even happen that all rules in a rule set are globally redundant and that removing some of these rules fixes all redundancies. Existing approaches to redundancy elimination focus on the problem of finding redundant rules, but do not address the full problem. The full redundancy elimination problem consists in finding a redundancy-free subset of the business rules that represents the same decision policy as the original rule project. The problem may take into account preferences between rules specifying which rules should be preserved and which rules should be eliminated if there are different ways for eliminating redundancies. Moreover the existing approaches for global redundancy elimination are limited to attributes over finite domains. For example, one approach checks whether a rule set makes a rule redundant by computing the number of cases that are treated by both the rule set and this rule. If this number is equal to the number of cases treated by the rule, then the rule is redundant. If it is strictly smaller than the number of cases treated by the rule, then the rule is not redundant. However, this reasoning is no longer valid if the rules are treating an infinite number of cases due to attributes with infinite domains (such as integer domains) such as:

r1: if the value of the customer is at least 1000 then set the category of the customer to "Gold";
r2: if the age of the customer is at least 40 then set the category of the customer to "Gold";

Rule r1 is not made redundant by rule r2. Rule r1 treats all cases of customers having a value of at least 1000 and an arbitrary age. If no artificial bound is imposed on the value attribute, then there are an infinite number of such cases. Now rules r1 and r2 treat both all cases of customers having a value of at least 1000 and an age of at least 40. Again there are an infinite number of such cases. According to one approach, rule r2 thus makes rule r1 redundant, which is wrong.

Other approaches extend local redundancy analysis to business rules of arbitrary form, such as the redundancy analyzer of IBM WebSphere Ilog JRules BRMS 7.0 and 7.1. These approaches find redundancies among rules that make decisions for cases that are characterized by an unbounded number of objects and thus an unbounded number of attributes. Moreover, the attributes may have infinite domains. Those approaches use an implicit representation of the treated cases of the rules in form of constraint models and use logical problem solving methods to do a pairwise comparison of the treated cases of two rules. Although those approaches handle arbitrary rules, they only detect locally redundant rules and are insufficient to determine a redundancy-free policy-preserving subset of a rule set. IBM and WebSphere are trademarks in the US and/or other countries of International Business Machines Corporation.

Still other approaches use a different notion of redundancy. For example, one approach determines overlaps among the sets of treated cases of two rules and eliminates those overlaps by making one rule more specific, thus favoring overlap-freeness over generality.

Another approach detects and repairs conflicts between rules for network flow management enforcement. These rules are applied to given data packets and perform several actions on those packets, such as packet filtering by a firewall or load-balancing. These rules check whether given attributes of the data packets ('fields') match given bit strings. The bit string may consist of set bits, clear bits, and don't care bits. The rules are thus able to test whether a string of fixed length, such as an IP address, matches a given pattern, but are not able to test attributes with infinite domains. The approach compares each pair of individual rules and determines whether they treat disjoint, overlapping, or equal sets of data packets or whether one of these set is a subset of the other set. If the sets are overlapping, the approach repairs conflicts according to a priority policy. The approach can merge the two rules, modify the condition of one of the rules or include the actions of the higher priority rule into the action list of the lower priority rule. If the lower priority rule becomes redundant in this process, the approach deletes it.

The approach is thus able to eliminate a rule that is made redundant by a single other rule supposing that the condition of the rules are restricted to match operations on strings of fixed length. The approach cannot find redundancies between rules that involve attributes with infinite domains. For example, the approach is unable to treat rules of the following kind and to detect that rule r1 makes rule r2 redundant:

r1: if the value of the customer is at least 1000 then set the category of the customer to "Gold";
r2: if the value of the customer is at least 2000 then set the category of the customer to "Gold";

More general rules may also differ in their scope, that is, match objects of different type, which poses particular difficulties for redundancy analysis. Those difficulties are not addressed by the patent application. Finally, another approach is unable to detect rules that are made redundant by a whole set of rules.

This approach facilitates the understanding of the filtering rules, optimizes the rule set, increases execution speed, and detects whether two filtering processes are equivalent. As each packet has a finite number of numeric attributes, the whole set of packets can be characterized in terms of a Cartesian space. Each filtering rule treats the packets within a rectangular region in this space. This supposes that the rule condition consists of interval membership tests and this is the same restriction that other approaches impose on the rules.

The approach splits Cartesian space into a set of minimum regions and characterizes each minimum region by a start and end point. This approach computes the relationship between the rules and the minimum regions treated by the rules. For this purpose, it processes the rules in the given preference order and labels the regions with the rules that cover them. If a rule covers only regions that are already covered by higher priority rules, then the approach says that the rule is concealed and eliminates it. Whereas the approach is thus able to compute a redundancy-free subset of the rules while preserving the decision-making behavior of the rule set, it has drawbacks. Firstly, it supposes that all rule conditions are interval membership tests. More complex tests involving arithmetic expressions and arbitrary comparison involving attributes with infinite domains are not handled by this. Secondly, the approach supposes that all rules match the same kind of object, namely a data packet, and cannot detect the relationship between rules that match different objects. For example, a rule that matches a customer object may make a rule matching a customer object and a shopping cart redundant. The approach does not provide any mechanism for handling rules matching different objects. Finally, the approach is prohibitive even for filtering rules as soon as these rules involve hundreds or thousands of attributes. For example, if there are already forty attributes and each attribute occurs in a test of some rule, then this will already generate a trillion of minimum regions. This explosion in space is the price of expanding the whole space that is covered by the rules.

The above examples show that existing approaches for redundancy analysis either impose limitations on the form of redundancies that they are capable to find or on the form of rules that they are capable to analyze. Moreover, there is no approach that treats the redundancy elimination problem as a whole and that is capable of computing a preferred redundancy-free and policy-preserving subset of business rules of arbitrary form.

BRIEF SUMMARY

In one embodiment of the present invention, a method for minimizing a rule set comprises building a rule set application graph that describes a set of rules including actions and cases, whereby each rule defines an action for one or more cases. The method further comprises building a rule violation graph for each rule describing the actions and cases not defined for that rule. In addition, the method comprises determining, by a processor, a subset of rules having a reduced number of rules with a same set of actions and cases as the rule set application graph by exploring candidate subsets of the set of rules that are sufficient for reproducing a behavior of an original rule set.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1A:
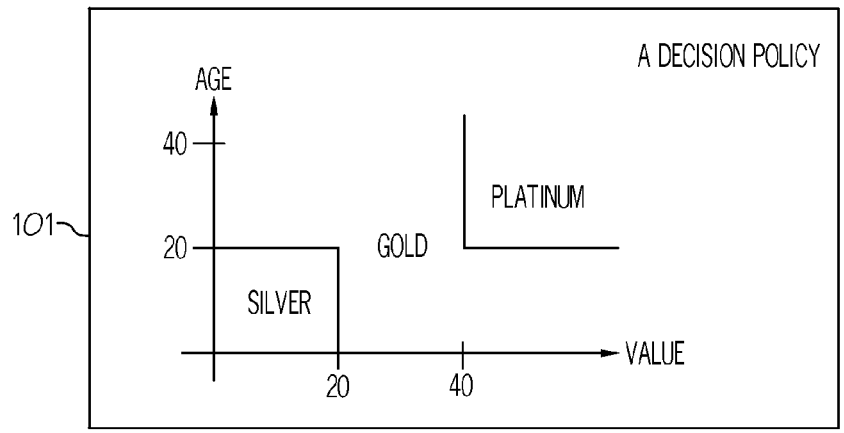
FIGS. 1A-1C illustrate an upper graph, a middle graph and a lower graph representing an example set of decisions and two corresponding rule sets in the attribute space of an example policy in accordance with an embodiment of the present invention.

The principles of the present invention disclose a method, system and computer program product for computing redundancy-free subsets of business rules of arbitrary form that represents the same decision policy as the original rules. The method, system and computer program product of an embodiment of the present invention guarantee that the computed subset of rules does not contain any redundant rule or non-applicable rule, but has exactly the same decision making behavior as the original rule set without making any assumption about the number and order of rule applications. In particular, the method does not alter the behavior of the rule set even if a single rule is applied. The method, system and computer program product do not limit the redundancy elimination to locally redundant rules that are made redundant by a single rule, but it is capable of identifying globally redundant rules that are made redundant by a combination of other rules. Furthermore, the method achieves the redundancy elimination for business rules of general form, which may differ in their scope, that is, in the number and types of objects that they are matching. In particular, the method is not limited to rules that are formulated over a finite number of attributes with finite domains.

As there may be different redundancy-free policy-preserving subsets of a rule set, the method takes into account preferences of importance between rules to guide the redundancy elimination process in choosing the rules to be kept and the rules to be eliminated. As such, the method, system and computer program product are adapted to keep more general rules and eliminate more specific rules. This particular adaption guarantees that the rules in the resulting rule set are as general as possible and cannot be replaced by more general rules contained in the original rule set. The method thus permits an informed way of reducing the size of a rule set without any impact on rule application. The benefits are a reduced effort in storing, managing, and changing rules. Indeed, logical independence and redundancy elimination are necessary for an effective agility of a rule set, that is, for allowing an easy adaption of the rules to changing business needs.

The method, system and computer program product achieve the rule set minimization by leveraging consistency-based explanation techniques such that different candidate subsets of the rule set are explored to see if they are sufficient for reproducing the decision-making behavior of the original rule set. If a candidate subset does not reproduce the behavior of the original rule set, then either some of the treated cases of the original rule set are missing in the candidate subset and/or some of the decisions that the original rule set may make for such a case is not made by the candidate subset. The second situation only arises if the original rule set contains rules that are making multiple decisions for some of the cases. A candidate subset is minimal and thus redundancy-free if it is not possible to remove any rule from this subset without introducing any missing case or any missing decision.

In one embodiment, said determining step comprises building rule violation graph candidate subsets from the rule violation graphs, each rule violation graph candidate subset comprising actions and cases not defined and further determining for each rule violation graph candidate subset if those actions and cases not defined are logically distinct from the actions and cases defined by the rule set application graph.

Furthermore, the method further comprises determining more than one valid reduced subset of rules and using preferences between rules to choose a preferred valid reduced subset of rules. The reduced subset of rules is valid in the sense that it preserves the actions and cases of the original rule set. In one embodiment, a topological rule sorter determines a total ordering of the rules by performing a topological sort of a graph that is formed by a rule set (as nodes) and given preferences on the rules of the rule set (as edges).

Advantageously said further determination comprises: building respective damaged-rule set graphs by joining the rule set application graph and each respective rule set violation graph candidate subset; and testing each damaged rule set graph for logical consistency.

More advantageously a rule set can define more than one object from an object type and wherein said building each damaged-rule set graph comprises building a damaged-rule set graph for each object defined by the rule set. Although the embodiment discusses building rule instance violation graphs for each object, the advantage comes from having a damaged-rule set graph for each object defined by the rule set including each object of a type or class of objects. If the embodiment only created damaged rule set graphs for the object type, then it would miss a significant number of damaged rule set graphs for solving to see if they had no missing cases or missing actions.

Suitably the method further comprising: identifying rules whereby the action of the rule is independent of the case of the rule; and ignoring the identified actions in the rule application graph and rule violation graph. More suitably, the rule set is split into parts, namely one for each action, and each part contains only the rules having the corresponding action; the method is then applied to each part.

Business rules are a convenient way to represent decision policies as used for routine decision-making tasks, such as loan approval, insurance claim processing, or discounting of shopping carts. The business rules capture knowledge about what is the best decision for which case. Each rule consists of a condition describing the cases treated by the rule and an action that makes a decision when being executed. On one hand, the business rules permit an effective vehicle for business automation as they can be applied to a huge number of cases via a decision service. On the other hand, they constitute an effective instrument in the hand of business analysts and decision makers to monitor and modify the decision policy if needed. If used correctly, business rules are an agile representation of the decision policy in the sense that a small change of the policy amounts to a small change in the rules. For example, if the decision maker wants to change the decision for a family of similar cases, then only a small number of rules should be impacted by such a change. Or said otherwise, it is sufficient to change a small number of rules in order to modify the decision-making behavior for a larger family of similar cases.

Firstly, the agility principle requires that each rule treats more than one case. If the cases and the rules were in a one-to-one relationship, then the decision maker would have to change the decision of each individual case and cannot change the decision-making behavior of a whole family of similar cases with a few edits of the rules. Furthermore, the number of possible cases may be huge or even infinite, thus prohibiting such a case-wise description of the decision policy. It is indeed a major advantage of business rules to provide a finite representation of a decision policy that concerns an infinite number of cases. It is another advantage of business rules that they split the description of more complex decision policies into different parts, namely the different rules. This split is done for parts of the decision policies that make different decisions or that concern groups of cases which are too distinct to be treated by a single rule. However, it needs to be understood that the same decision policy can be represented by different business rule sets as there are different ways to split the set of all cases into families of similar cases.

Figure 1B:
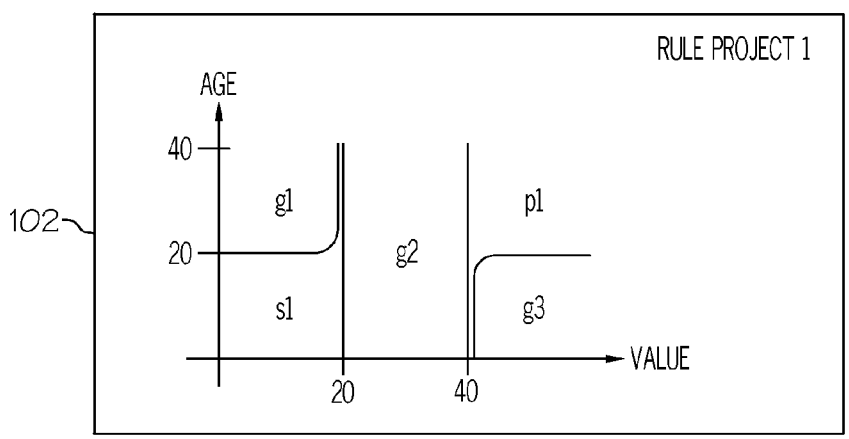
Figure 1C:
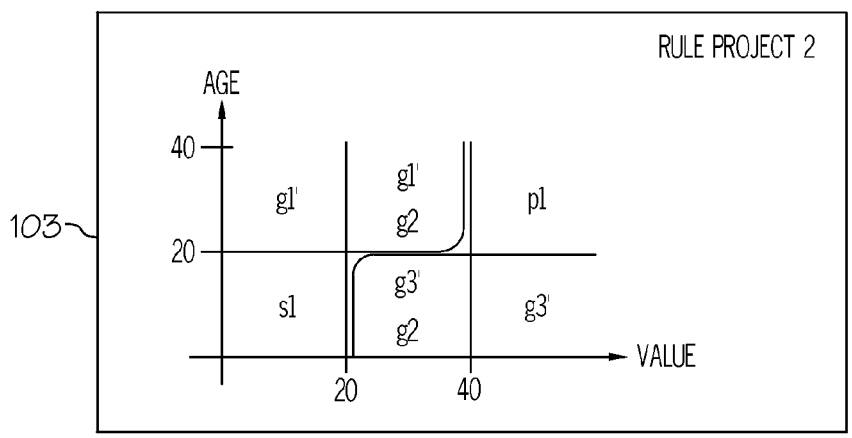

Table 1 shows an example business rule project 1 that represents the decision policy of a simple customer categorization problem as it occurs in customer loyalty programs. The policy makes decisions about the customer category depending of the customer age and the cart value, that is, the value of the items that the customer has bought. These two attributes therefore characterize a case of the customer categorization problem and the space of all cases corresponds to a two-dimensional space as it is depicted in FIGS. 1A-1C in accordance with an embodiment of the present invention. FIGS. 1A-1C illustrate an upper graph 101, a middle graph 102, and a lower graph 103 representing an example set of decisions and two corresponding rule sets, respectively, in the attribute space of an example policy. Graph 101 of FIG. 1A shows the decision policy by indicating the decision for the cases. This decision policy can be represented by rules making up a rule set. For example, rule project 1 in Table 1 comprises a rule set of non-overlapping rules, that is, each case is treated by exactly one rule. Graph 102 of FIG. 1B shows the cases treated by each rule of the rule set in the form of rectangular areas. The area covered by rule s1 corresponds to the part of the decision policy for which the category Silver is chosen. The area covered by rule p1 corresponds to the part of the decision policy for which the category Platinum is chosen. The remaining rules g1, g2, and g3 divide the area for which the category Gold is chosen into different parts.

TABLE 1

Rule Project 1

| | |
|---|---|
| s1 | if the age of the customer is less than 20 and the value of the customer is less than 20 then set the category of the customer to "Silver"; |
| g1 | if the age of the customer is at least 20 and the value of the customer is less than 20 then set the category of the customer to "Gold"; |
| g2 | if the value of the customer is at least 20 and the value of the customer is at most 40 then set the category of the customer to "Gold"; |
| g3 | if the age of the customer is less than 20 and the value of the customer is more than 40 then set the category of the customer to "Gold"; |
| p1 | if the age of the customer is at least 20 and the value of the customer is more than 40 then set the category of the customer to "Platinum"; |

When reviewing rule project 1, a business analyst detects that rules g1 and g3 are not in a most general form. More general rules have the advantage that they cover larger areas in the case space and make it easier to change the decision for larger groups of cases supposing that those cases are similar enough. The analyst therefore decides to replace rule g1:
g1: if the age of the customer is at least 20 and
the value of the customer is less than 20
then set the category of the customer to "Gold";
by the more general rule g1':
g1': if the age of the customer is at least 20 and
the value of the customer is at most 40
then set the category of the customer to "Gold";
Similarly, the analyst decides to replace rule g3
g3: if the age of the customer is less than 20 and
the value of the customer is more than 40
then set the category of the customer to "Gold
by the more general rule g3':
g3': if the age of the customer is less than 20 and
the value of the customer is at least 20
then set the category of the customer to "Gold";
This leads to a new rule project, namely business rule project 2, which is described in Table 2. Graph 103 of FIG. 1C shows that business rule project 2 represents the same decision policy as business rule project 1. The difference consists in the way how the group of cases that are subject of category "Gold" is split among the rules g1, g2, g3 and among the rules g1', g2, g3'.

TABLE 2

Figure 2A:
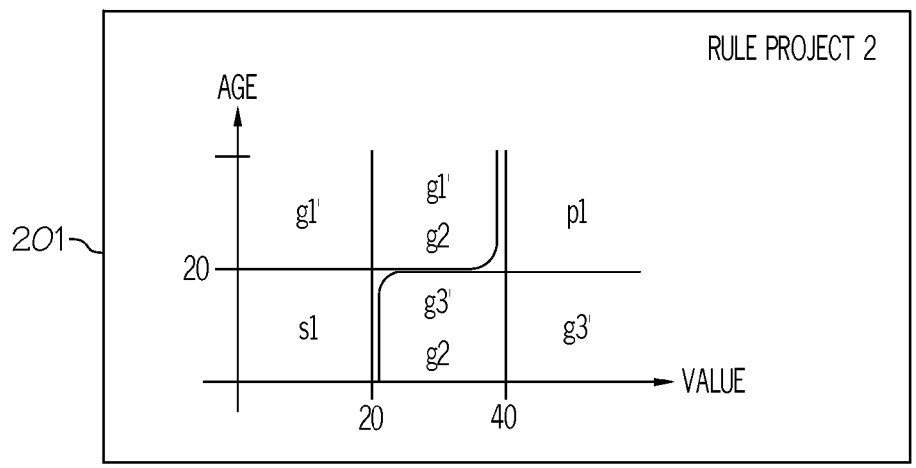
FIGS. 2A-2C illustrate an upper graph, a middle graph and a lower graph representing a rule set, a cleaned rule set and a damaged rule set from the example of FIG. 1 in accordance with an embodiment of the present invention.
Figure 2B:
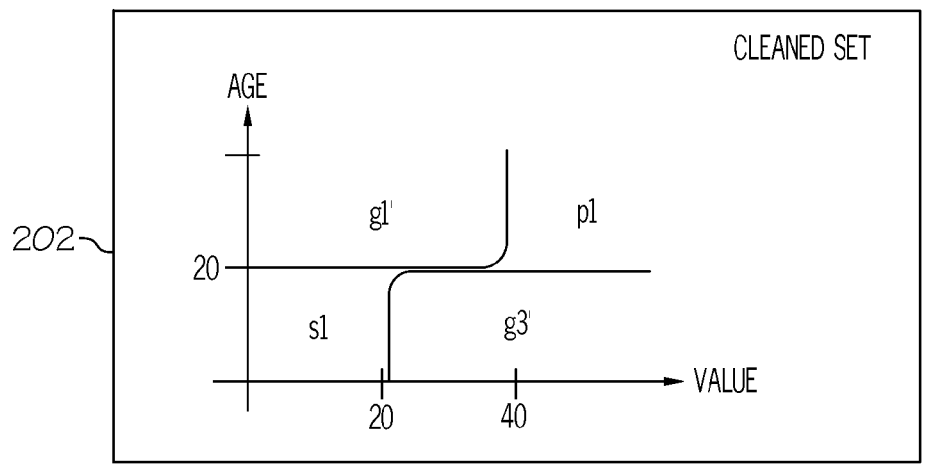
Figure 2C:
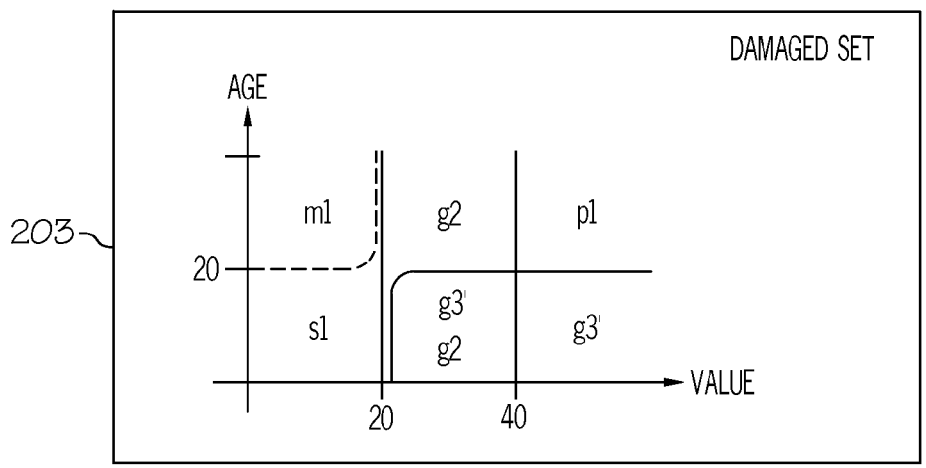

Rule Project 2 s1  if the age of the customer is less than 20 and the value of the customer is less than 20 then set the category of the customer to "Silver";
g1' if the age of the customer is at least 20 and the value of the customer is at most 40 then set the category of the customer to "Gold";
g2  if the value of the customer is at least 20 and the value of the customer is at most 40 then set the category of the customer to "Gold";
g3' if the age of the customer is less than 20 and the value of the customer is at least 20 then set the category of the customer to "Gold";
p1  if the age of the customer is at least 20 and the value of the customer is □more than 40 then set the category of the customer to "Platinum";

As the rules of rule project 2 have more general conditions than the rules of rule project 1 and thus treat more cases, it is possible that this rule project has redundant rules even if the original rule project was redundancy-free. Indeed, rule g2 is redundant in rule project 2. The cases of rule g2 are either treated by rule g1' or by rule g3' and this in the same way as by rule g2, i.e., rules g1' and g3' are making the same decision as g2 for each of the cases treated by g2. As a consequence, it is possible to remove rule g2 from rule project 2 without changing the behavior which is illustrated in FIGS. 2A-2C in accordance with an embodiment of the present invention. FIGS. 2A-2C illustrate an upper graph 201, a middle graph 202 and a lower graph 203 representing a treated rule set, a cleaned rule set and a damaged rule set, respectively, from the example of FIGS. 1A-1C. FIG. 2A shows the treated modified cases of rule project 2 in graph 201. Graph 202 of FIG. 2B shows the treated cases of the cleaned rule set that is obtained after removing rule g2. The removal of g2 does not introduce any missing case. Graph 203 of FIG. 2C shows the effect of removing a non-redundant rule. For example, the removal of rule g1 introduces missing cases characterized by an age of at least 20 and a value of less than 20. Whereas the cleaned rule set represents the decision policy of the first example, the damaged rule set obtained by removing the non-redundant rule r2 does not represent this policy as it has missing cases.

In this first example, there is a single redundant rule and it is sufficient to remove this rule from the rule project to eliminate this redundancy. In general, there may be multiple redundant rules and different ways of eliminating redundancies, meaning that a system for redundancy elimination has to make some choice.

Figure 3A:
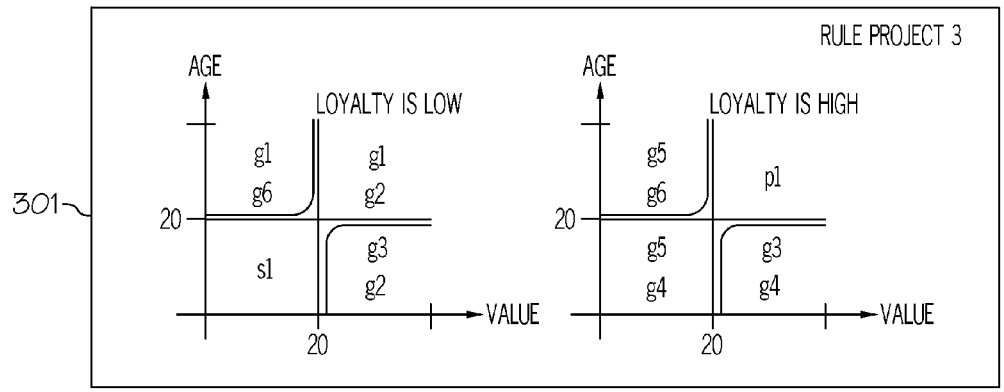
FIGS. 3A-3C illustrate left and right upper graphs representing rule set 3, left and right middle graphs representing a first way of cleaning rule set 3 and the lower graphs representing a second way of cleaning rule project 3 in accordance with an embodiment of the present invention.
Figure 3B:
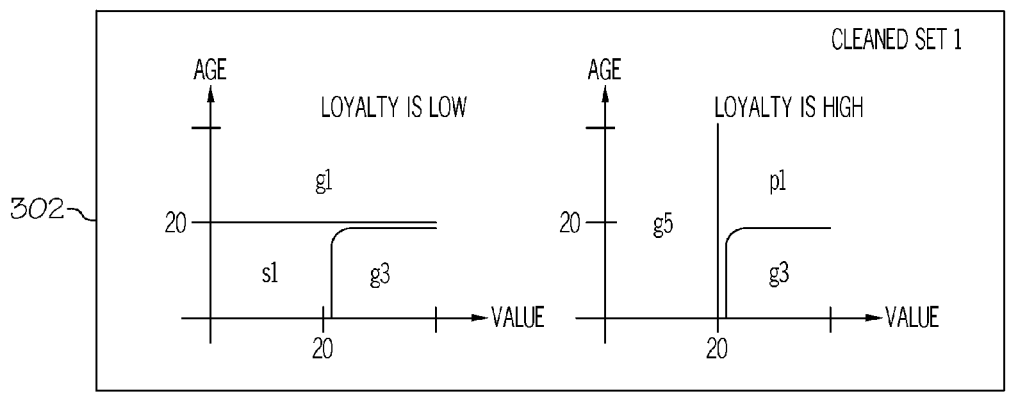
Figure 3C:
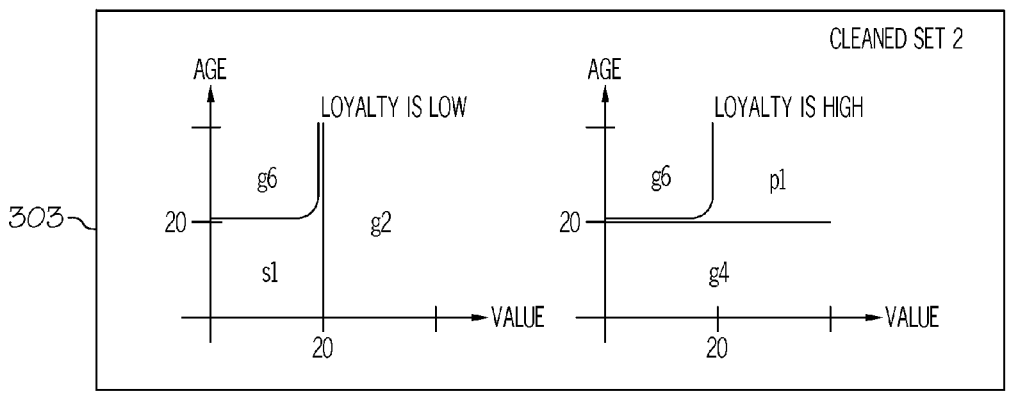

The following rule project 3 provides an example for redundant rules that can be eliminated in different ways. It has eight rules s1, p1, and g1 to g6 which are listed in Table 3. They represent a decision policy that determines a customer category based on three attributes, namely the customer age, the value of the items bought by the customer, and the customer loyalty, which may be low or high. Hence, the cases of this rule project are characterized in terms of a three-dimensional space as illustrated in FIGS. 3A-3C in accordance with an embodiment of the present invention. FIGS. 3A-3C illustrate left and right upper graphs 301, left and right middle graphs 302 and left and right lower graphs 303, respectively. Upper graphs 301 of FIG. 3A represent treated rule projects 1 and 2, middle graphs 302 of FIG. 3B represent a first way of cleaning rule project 3 and lower graphs 303 of FIG. 3C represent a second way of cleaning rule project 3. The left graphs shows the treated cases for low loyalty customers and the right side graphs shows the treated cases for high loyalty customers. Upper graphs 301 of FIG. 3A show the treated cases of the rules in form of two two-dimensional layers of this three-dimensional space.

TABLE 3

Rule Project 3 s1  if the age of the customer is less than 20 and the value of the customer is less than 20 and the loyalty of the customer is low then set the category of the customer to "Silver";
g1  if the age of the customer is at least 20 and the loyalty of the customer is low then set the category of the customer to "Gold";
g2  if the value of the customer is at least 20 and the loyalty of the customer is low then set the category of the customer to "Gold";
g3  if the age of the customer is at most 20 and the value of the customer is at least 20 then set the category of the customer to "Gold";
g4  if the age of the customer is at most 20 and the loyalty of the customer is high then set the category of the customer to "Gold";
g5  if the value of the customer is at most 20 and the loyalty of the customer is high then set the category of the customer to "Gold";
g6  if the age of the customer is at least 20 and the value of the customer is at most 20 then set the category of the customer to "Gold";
p1  if the age of the customer is more than 20 and the value of the customer is more than 20 and the loyalty of the customer is high then set the category of the customer to "Platinum";

There are six rules that choose a customer category of Gold. A close inspection of their treated cases shows that each of these rules is made redundant by some of the other rules:
Rule g1 is made redundant by rules g6 and g2.
Rule g2 is made redundant by rules g1 and g3.
Rule g3 is made redundant by rules g2 and g4.
Rule g4 is made redundant by rules g3 and g5.
Rule g5 is made redundant by rules g4 and g6.
Rule g6 is made redundant by rules g5 and g1.
Although all rules are made redundant by some other rules, removing all rules will not only eliminate all these redundancies, it will also lead to a rule set that no longer assign the Gold category to any customer. Indeed, the resulting rule set does not represent the part of the decision policy that concerns Gold decisions. This example shows that redundancy elimination cannot be achieved by two separate tasks, where the first task consists in detecting all redundant rules and the second task consists in eliminating them. Indeed, redundancy elimination consists of a single task, namely that of computing a redundancy-free subset of the given rule set that represents the same decision policy as the rule set. In general, there may be several of those redundancy-free subsets of a rule set. For example, rule project 3 has two redundancy-free subsets that represent the given decision policy. The first redundancy-free rule set consists of the rules s1, g1, g3, g5, p1. Graphs 302 of FIG. 3B show the treated cases of this rule set and it coincides with those of rule project 3. The second redundancy-free rule set consists of the rules s1, g2, g4, g6, p1. Graphs 303 of FIG. 3C show the treated cases of this rule set, which again coincides with those of rule project 3.

Whereas the tasks of finding all redundant rules in a rule set and of eliminating these redundant rules have unique results, the task of making a rule set redundancy-free may have multiple results. A redundancy eliminator therefore has to make a certain choice when computing a redundancy-free subset of the same behavior. A redundancy eliminator may either compute an arbitrary redundancy-free subset or a redundancy-free subset that is preferred by the business analyst who is deciding how to represent the decision policy in terms of rules.

A redundancy eliminator requires additional input to compute a preferred redundancy-free subset of rules that represents the given decision policy. An interactive redundancy analyzer presents a list of redundant rules to the business analyst in each step and asks this user to choose one rule to eliminate. It then eliminates this rule, thus producing a reduced rule set that represents the same decision policy as the non-reduced rule set. The system then recomputes the list of redundant rules and again asks the business analyst to choose one rule for elimination. The system iterates this process until the remaining rules no longer contain any redundant rule. As the decision policy is preserved in each step, the final subset is redundancy-free and represents the decision policy of the original rule set.

Whereas this interactive approach gives the business analyst a complete control over the redundancy elimination process, it requires frequent user interactions and may submit long lists of redundant rules to the user each time. The list may shrink slowly, meaning that the user has to re-examine the same rules again and again. It appears that this repeated examination of long lists of rules is not needed, since the redundancy eliminator simply requires an ordering of all the rules and this is independent of the fact whether the rules are redundant or not. Instead of asking a user to repeatedly examine long lists of redundant rules, a preference-based redundancy analyzer simply asks for a total ordering of the rules as additional input before starting the redundancy elimination process. If a rule precedes another rule in the ordering, it is preferred to this other rule. The non-preferred rule should be eliminated first and the preferred rule should be eliminated last.

Whereas the task of ordering all rules is easier than that of repeatedly examining lists of redundant rules, it still requires significant effort from the business analyst. Often, the business analyst may be indifferent with respect to the ordering of some of the rules and express preferences between only some other rules. The analyst may thus specify a partial preference (pre)order between rules, which can be represented in terms of graphs or logical expressions.

For example, the analyst may express the following importance preferences between the rules:
rule g2 is preferred to g1.
rule g1 is preferred to g5.
rule g5 is preferred to g6.
rule g1 is preferred to g3.
rule g3 is preferred to g4.
rule g4 is preferred to g6.

A preference-based redundancy eliminator will first choose a way to complete such a partial preference ordering of the rules in the rule set by a total ordering. One possible completion is the total ordering s1, p1, g2, g1, g5, g3, g4, g6. This ordering satisfies each of the preferences listed above as each preferred rule of a preference precedes the non-preferred rule of the preference in the ordering. It gives rise to a single preferred redundancy-free policy-preserving subset of the original rule set. Some other ordering may lead to a different preferred subset.

As explained in terms of these two examples, a preference-based redundancy eliminator receives a business rule project and a description of a partial preference ordering between the rules of this project as input. It computes a preferred redundancy-free subset of these rules that preserves the decision policy of the original rule set.

Figure 4:
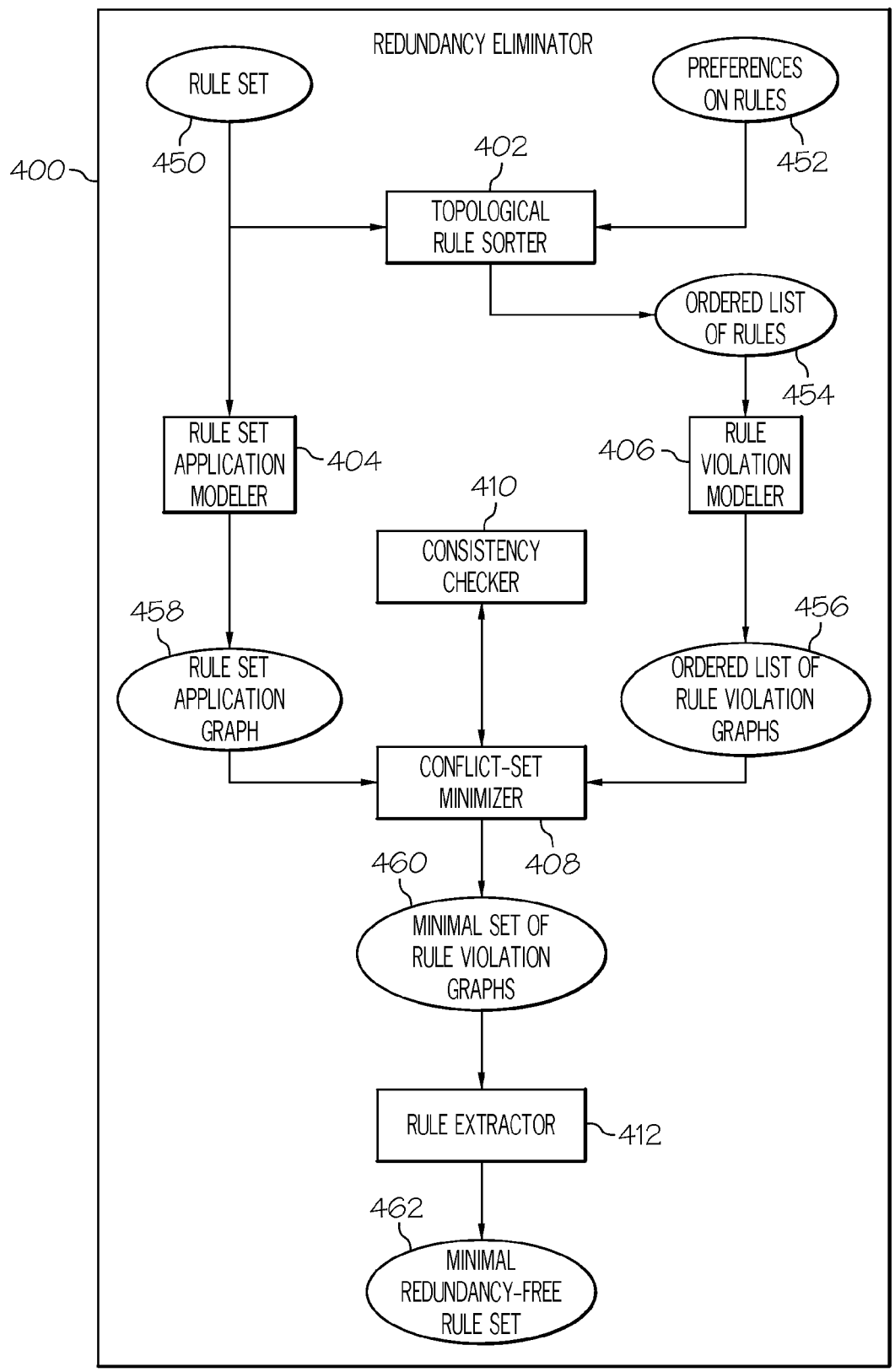
FIG. 4 illustrates components of a preference-based redundancy eliminator and data flow steps between these components in accordance with an embodiment of the present invention.

FIG. 4 shows the components 402-412 of a redundancy eliminator 400 according to an embodiment of the present invention; data stages 450-462 are shown between these components.

Redundancy eliminator 400 comprises: a topological rule sorter 402; a rule set application modeler 404; a rule violation modeler 406; a conflict-set minimizer 408; a consistency checker 410 and a rule extractor 412.

Topological rule sorter 402 determines a total ordering of the rules 454 by performing a topological sort of a graph that is formed by a rule set 450 (as nodes) and given preferences on the rules 452 of the rule set (as edges).

Rule set application modeler 404 models the decision policy represented by the whole rule set 450 in terms of a constraint graph called rule set application graph 458; literally modelling the application of the rules. Rule set application graph 458 describes in an implicit logical form that some rule is applicable and that its decision is made by the policy. The nodes of this graph correspond to expressions, tests, conditions, and actions occurring in the rules. An action node describes that the decision made by the rule is made by the rule set. This is modeled by an equality between a global rule set action and the action of the rule. A logical problem solver (part of consistency checker 410) can find solutions of this graph which correspond to combinations of the treated cases of the rules and the decisions made for these cases.

Rule violation modeler 406 models the violations of the rules (the actions and cases missing from the rule set) rather than the application of rules (the treated actions and case of the rule set); it constructs an ordered list of rule violation graphs 456, one for each rule. Each rule violation graph is a type of constraint graph and describes that either the rule is not applicable or that its action is not made by the policy. A combination of a case and an action satisfies this graph if either the case is not treated by the rule or the action is different to the action made by the rule. The rule violation modeler 406 constructs graphs for each rule in the given ordering and returns an ordering of rule violation graphs that corresponds to the ordering of the rules. The rule violation graphs are modeled by a difference constraint between the global rule set action and the action of the rule. A logical problem solving engine finds solutions of this graph which correspond to a combination of a missing case and an arbitrary action or a combination of a treated case and a missing action.

Conflict-set minimizer 408 determines a preferred and minimal subset of the rule violation graphs that are sufficient to be in logical contradiction with the rule set application graph 458. Conflict-set minimizer 408 uses the rule set application graph 458 as background and the individual rule violation graphs 456 as foreground. The set of solutions of graph 458 and the sets of solutions of graphs 456 do not intersect, meaning that the combination of the rule set application graph 458 and all the rule violations graphs 456 has no solution and is logically inconsistent. A subset of rule violation graphs that in combination with the rule set application graphs has no solution will be inconsistent with the original rule set. The conflict-set minimizer 408 then determines subsets of the rules such that the rule violation graphs of those rules are still inconsistent with respect to the rule set application graph 458, meaning that there is no treated case of the rule set that is a missing case for the rules in the subset and there is no decision made by the rule set for some case that cannot be made by the rules in the selected subset for the same case. The conflict-set minimizer 408 identifies a subset of rules that comprises a minimal set of rules still inconsistent with the original rule set; this is referred to as the minimal subset of rules. Hence, the minimal subset of rules is sufficient to reproduce the decision-making behavior of the original rule set and the minimal condition ensures that the minimal subset is redundancy-free. It is possible to accelerate the redundancy elimination for rule sets that have many redundant rules by removing whole blocks of redundant rules in a single step. It is further possible to use importance preferences between rules for guiding the choice of rules that are removed during the redundancy elimination process. The accelerated redundancy elimination and rule choice guidance are not dissimilar to methods described in a document QuickXplain. "QuickXplain: Preferred Explanations and Relaxations for Over-Constrained Problems" by U. Junker published in the Proceedings of the Association for the Advancement of Artifical Intelligence (AAAI) 2004.

The redundancy elimination method can be simplified and its computational effort can be reduced if the decision made by a rule is independent of the case that is treated by the rule. In this situation, each subset of rules that is making the same decision can be processed separately and the rule decision can be ignored in the rule application and rule violation graphs. As the simplified method ignores the decision, it is capable to eliminate redundancy from sets of missing rules, which do not have an action part.

Consistency checker 410 provides the processing engine for determining the preferred and minimal subsets of the rule violation graphs and is described in more detail with reference to FIG. 6 below.

Rule extractor 412 receives a minimal set of rule violation graphs 460 and extracts the rules associated to the rule violation graphs in the selected subset. This extracted subset of rules is the minimal redundancy-free rule set 462.

Redundancy eliminator 400 returns the minimal redundancy-free rule set 462 as the result.

Hence, redundancy eliminator 400 uses conflict-set minimizer 408 and consistency checker 410 to reduce rule sets and determine a minimal subset of foreground constraints that are in logical contradiction with a given background constraint. Redundancy eliminator 400 provides the model of the decision policy, that is, the rule set application graph as background constraint and the rule violation graphs as foreground constraints. These foreground constraints are satisfied by missing cases of the original rule set (that is, cases that are not treated by any rule of the original rule set) or by missing decisions for treated cases of the original rule set (that is, decisions that are not made by the original rule set for these cases). The background constraint is satisfied by the treated cases of the original rule set and the decisions made by this rule set for the treated cases. There is no combination of a case and a decision that satisfies both the background constraint and the foreground constraints, meaning that the conjunction of the background constraint and all the foreground constraints is inconsistent. Conflict-set minimizer 408 then explores different subsets of the foreground constraints, that are subsets of the set of all rule violation graphs generated for the rules in the original rule set. Each subset of rule violation graphs corresponds to a subset of the rules. If a subset of foreground constraints has a solution that satisfies also the background constraint, then there exists a case treated by the original rule set that is a missing case for the subset of rules or that has a missing decision for this subset of rules. Graph 203 of FIG. 2C illustrates such a missing case for a subset of rules for rule project 2. This subset is obtained by removing rule g1 and consists of the rules s1, g2, g3, p1. As the removal of g1 creates a missing case, this subset does not represent the decision policy of the original rule set. This is modeled inside the conflict-set minimizer 406 by the removal of the rule violation graph of rule g1. The removal of a rule violation graph can thus increase the missing cases or missing decisions of the candidate subset.

In one embodiment, the conflict-set detection problems are recursively split into smaller parts and accelerate the detection if the resulting conflict set is small compared to the original set of foreground constraints. If a rule set contains many redundant rules, whole blocks of redundant rules are removed by doing a single consistency check. Such a mechanism is already known in conflict-set minimization, but it is not known to optimize rule set minimization. For example, QuickXplain is able to a compute minimal and preferred conflict-set but does not discuss how it might be applied in the reduction of rule sets.

Rule set application modeler 404 builds a constraint graph that represents the treated cases and actions of a rule set in an implicit form as a data tree structure having a root node and child nodes connected by edges. The cases and actions are formed of logical expressions and the rule set application modeler 404 recursively traverses the logical expressions of each rule in the rule set, a rule comprising and maps each visited logical expression to a node in the graph. It guarantees a unique representation, that is, two occurrences of the same expression are mapped to the same graph node. Rule set application modeler 404 maps primitive expressions, such as numbers, string literals, and objects matched by the rules to leaf nodes, and it maps composed expressions, such as arithmetic operations, comparisons, accesses to attributes of objects to inner nodes which are labelled by an operator and which have outgoing edges to the nodes that represent their expressions. Leaf nodes that represent an object matched by the rule are canonically renamed by type and number for each rule to reduce the size of the graph. For example, if the rule matches an object called "the customer," then the modeler renames it into "Customer1." Rule set application modeler 404 constructs the rule applicability graph of a rule by introducing a graph node that represents the conjunction of tests of this rule and that has outgoing edges to the nodes representing these tests. Finally, rule set application modeler 404 introduces the root node of the rule set applicability graph which represents the disjunction of the different rule applicability graphs and which has outgoing edges to the nodes representing these rule applicability graphs. A labelling of the graph nodes, that respects the operations of the nodes and that labels the root node by "true," represents a treated case.

In this way, rule set application modeler 404 is similar to a treated-case modeler in European patent application EP20100306464.8 by the present inventor, titled "Method and System for Detecting Missing Rules with Most-General Conditions." However, the treated-case modeler only takes the condition of the rule into account, whereas; rule application modeler 404 also models the action of a rule by an adequate constraint. Redundancy elimination as considered in the embodiment removes rules that are redundant for all sequences of rule applications. In particular, a rule is only considered redundant if it does not change the behavior of a rule set even if a single rule is applied. In more complex settings, several rules may be applied in sequence to a case. It is possible that a rule is made redundant by longer sequences of rule applications, but not by shorter sequences. When eliminating redundant rules, it is thus sufficient to look at the shortest sequences and the shortest sequences have the length one, that is, it just consists of a single rule. In other words, this means that sequences of rules need not be examined when eliminating redundancies.

Redundancy analysis needs to consider only a single rule application and determines the action that is made by applying this rule. This action may be the same for all the cases treated by the rule or depend on certain objects of the case or on the values of certain of their attributes. The rule action takes these objects and attributes values into account.

Figure 5:
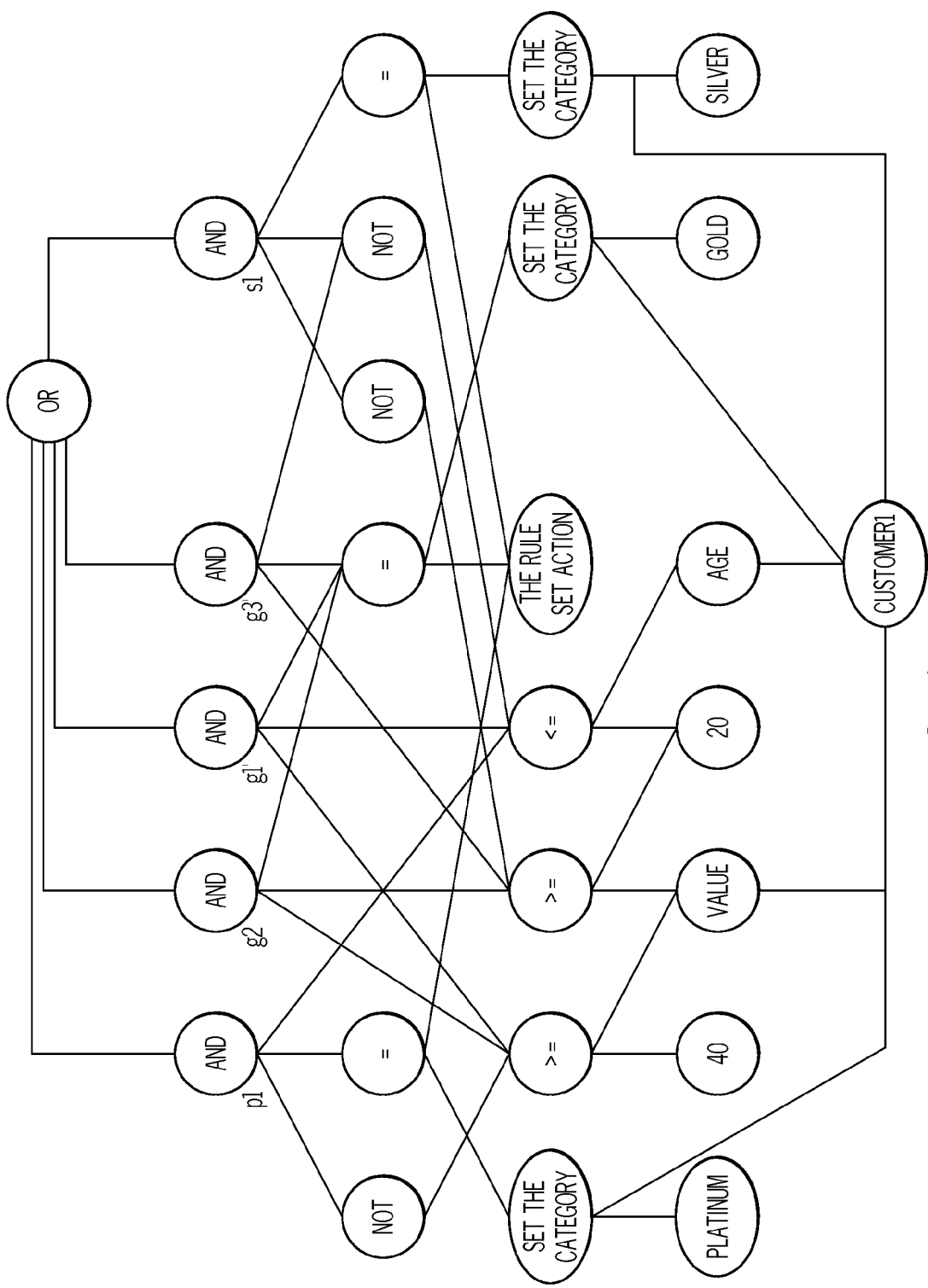
FIG. 5 illustrates a rule set application graph for a rule set 2 in accordance with an embodiment of the present invention.

FIG. 5 shows the rule set application graph for the rule set of rule project 2 in accordance with an embodiment of the present invention; the rule set application graph describes that a rule is applied by the rule set and has an action equal to the rule set action. Referring to FIG. 4, in conjunction with FIG. 4, rule set application modeler 404 models the action of a rule by a specific action node (for example, the node labelled 'set the category' in the Figure) that has outgoing edges to the nodes representing the objects (for example, the nodes labelled 'customer1') and values on which the action depends (for example, the nodes labelled 'platinum'; 'gold' and silver'). Executing a rule action changes the state such that the decision is made in the new state. As the rule action will only modify those parts of the state that concern the decision and keep the remaining parts of the state unchanged, different rule actions necessarily differ in the decision they are making. The rule set application modeler 404 therefore does not model the decision made by a rule set, but the action that makes this decision. For example, the rules of rule projects 1, 2, and 3 have actions, such as "set the category of the customer to Gold." This action consists of an action scheme, namely, "set the category of some customer object to some value" which is applied to the object "the customer" and the value "Gold" (see 'set the category' nodes in FIGS. 5 and 7 to 12).

An action is thus parameterized by expressions that depend on the case. Two actions are equal if they use the same scheme and same parameters. It is also possible that there are two different ways to express the same action. For example, there may be two different methods, namely, "set the category of some customer to Gold" and "classify some customer as Gold customer" that assign Gold to the category of a customer object. If this is possible, then the redundancy analyser needs additional knowledge stating that these two different methods represent equal actions under certain conditions.

As the rule set application modeler 404 supposes that the rule set makes a single decision, it models the action that makes this decision by a specific leaf node titled the 'rule set action' node (see FIGS. 5 and 7 to 12). The rule set action node will be equal to the action of some rule. The rule set application modeler 404 models this by equality nodes representing the equalities between the rule set action and the actions of the different rules (see the nodes labelled '=' in FIG. 5 and FIGS. 7 to 12). Each equality node has two outgoing edges, namely, one leading to the rule set action node and the other one leading to the rule action node. A rule application graph of a single rule then consists of a conjunction node that represents the conjunction of the tests of the rules and the equality of the rule set action and the action of the rule (see the nodes labelled 'and' in FIG. 5 and FIGS. 7 to 12). The conjunction node has outgoing edges to the nodes representing these sub-expressions. Once the rule set application modeler has built a rule application graph for each of the rules in the rule set, it forms them into a rule set application graph by creating a disjunction node connecting all the rule application graphs (see the node labelled 'or' at the top of FIGS. 5, 11 and 12).

The rule violation modeler 406 processes the rules in the ordering that has been determined by the topological rule sorter 402. Rule violation modeler 406 constructs a rule violation graph for each rule and returns the rule violation graphs in the same ordering as their rules. The rule violation modeler 406 maps the matched objects of the rule to leaf nodes that represent logical variables. The variables of a rule are canonically named by type and number. Hence, rule violation modeler 406 will introduce two nodes "?customer1" and "?customer2" if a rule matches two customer objects. If another rule matches a single customer object, then the modeler will introduce a single leaf node "?customer1." The modeler maps the tests in the rule condition and its sub-expressions to adequate graph nodes in the way as it has been described for the rule set application modeler. Similar to the rule set application modeler 404, rule violation modeler 406 creates a graph node representing the equality of the rule set action and the action of the rule. Similar to the rule set application modeler 404, rule violation modeler 406 creates a node representing the conjunction of the tests of the rule and of the equality of the rule set action and the action of the rule. This node has outgoing edges to the nodes representing the tests and the equality. The modeler further introduces a graph node that represents the rule body, that is, the negation of the before-mentioned conjunction of tests and equality of the rule set action and rule action; and this node has an outgoing edge to the graph node representing the before-mentioned conjunction. Finally, the rule violation modeler 406 builds the rule violation graph by creating a closure node that represents the universal closure of the rule body. This closure node lists all the variables occurring in the rule and describes that the rule body holds for all combination of objects that can be used to instantiate the variables. The resulting rule violation graph thus describes that each instance of the rule is non-applicable or has an action that is different to the rule set action.

The conflict-set minimizer 408 receives a full set of ordered rule violation graphs. Node by node, the conflict-set minimizer 408 examines a subset of these rule violation graphs and checks whether the examined subset has a missing case or missing decision among the treated cases of the decision policy and the decisions that are made by it. If this happens, then the subset of rules is insufficient to reproduce the decision policy; this subset of rules constitutes a damaged rule set. The purpose of the consistency checker is to see whether the subset of selected rules reproduces the decision policy or constitutes a damaged rule set.

Figure 6:
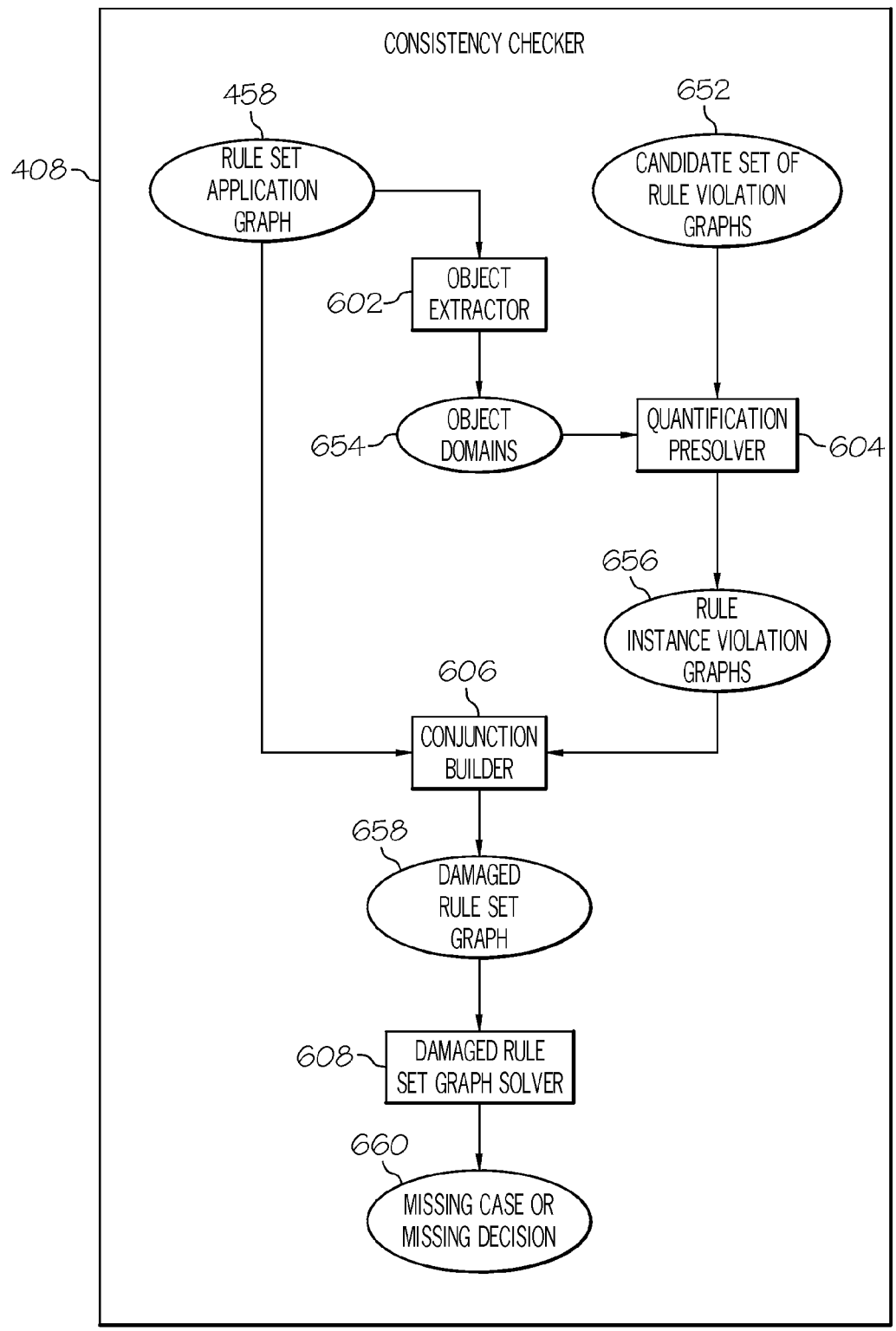
FIG. 6 illustrates components of a consistent checker and the data flow steps between these components in accordance with an embodiment of the present invention.

FIG. 6 shows a data-flow diagram of consistency checker 408 which is employed by the conflict-set minimizer in accordance with an embodiment of the present invention. Consistency checker 408 comprises: object extractor 602; quantification presolver 604; conjunction builder 606; and damaged-rule set graph solver 608. Consistency checker 408 receives a candidate subset of the rule violation graphs 652 and the rule set application graph 458.

Object extractor 602, in a first step, extracts all objects from the rule set application graph 458 and forms object domains 654; in the present example 'customer1' is the only domain.

Quantification pre-solver 604, in a second step, instantiates universally quantified rule instance violation graphs 656 from a candidate set of rule violation graphs 652 and object domain 654. Quantification pre-solver 604 determines all combinations of objects from the object domain that may be used to instantiate the variables of the rule violation graph 610. Quantification pre-solver 604 then creates a rule instance violation graph 656 for each combination of an object in a class of objects and a rule violation graph by replacing each occurrence of each object variable by the object that is used to instantiate the object variable. For example, if the variables of a rule consists of "?customer1" and there are three customer objects "Customer1," "Customer2," and "Customer3" in the object domain, then quantification pre-solver 604 creates three instances of the rule violation graph. It produces the first one by replacing all occurrences of variable "?customer1" in the rule body by "Customer1," the second one by replacing all occurrences of "?customer1" in the rule body by "Customer2," and the third one by replacing all occurrences of "?customer1" in the rule body by "Customer3."

Conjunction builder 606 builds a damaged-rule set graph 658 by creating a graph node that represents the conjunction of the rule set application graph 458 and all rule instance violation graphs 656 of all rules in the candidate subset.

Figure 7:
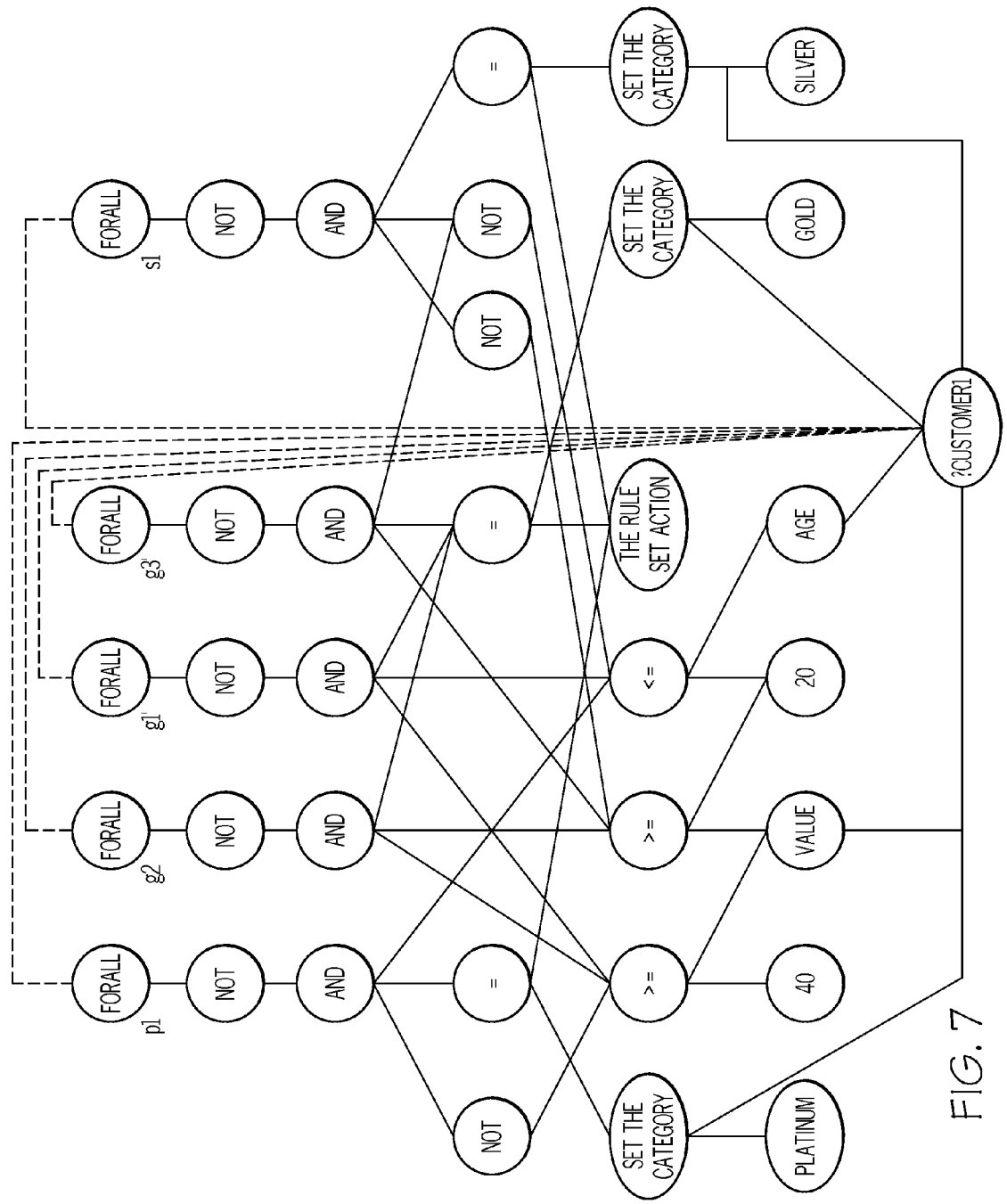
FIG. 7 illustrates example rule violation graphs which are an input to the damaged-rule set checker of FIG. 6 in accordance with an embodiment of the present invention.

FIG. 7 shows the damaged-rule set graph 614 of rule project 2 which is input to the damaged-rule set graph solver 608 of FIG. 6 in accordance with an embodiment of the present invention. At this stage, the damaged-rule set graph 658 uses a variable "?Customer1" that will be changed to an object "Customer1" later in the process. Damaged-rule set graph 658 uses universal quantifiers to express that for all customers that the respective rules are violated. Dotted lines are used from the nodes labelled "forall" to the node labelled "?Customer1" in order to keep the drawing readable.

Figure 8:
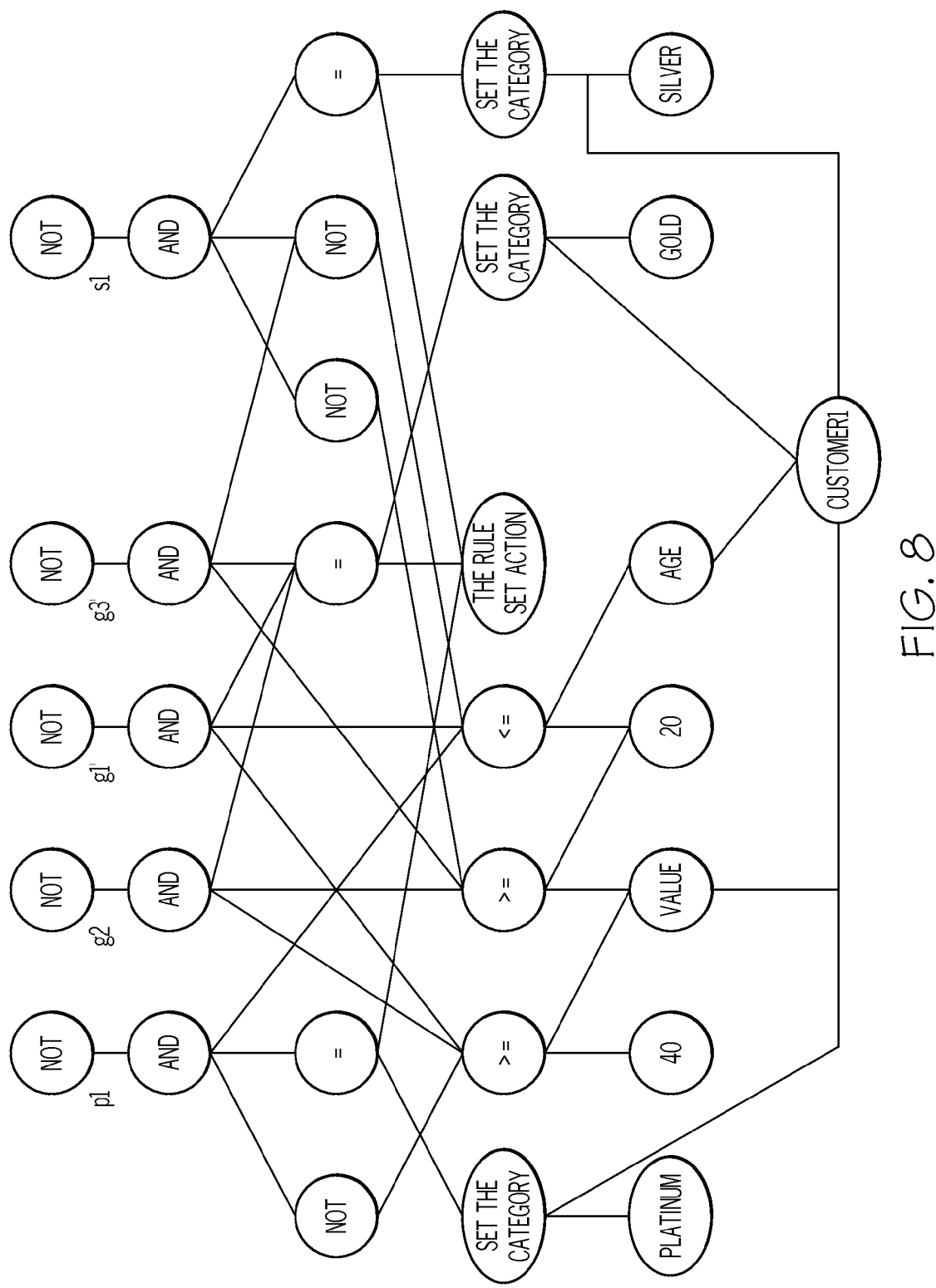
FIG. 8 illustrates the rule instance violation graphs of all rules of rule project 2 in accordance with an embodiment of the present invention.

For comparison, FIG. 8 shows a graph of all the rule instance violation graphs of rule project 2 in accordance with an embodiment of the present invention.

Referring to FIG. 6, in the final step, damaged-rule set graph solver 608 traces logical states through the graph nodes of damaged-rule set graph and labels the graph nodes in a way that respects the operations expressed by the graph nodes and that labels the root node by "true." The damaged-rule set graph solver starts at the root node and traverses from parent node to child node along edges calculating the logical state at each child node; it checks the node for the existence of a label and marks the node with the label if there is no pre-existing label. Certain logical states are easy to trace. If a parent 'and' node is labelled true, then all child nodes will be true. A parent 'not' node will have a child node that is the reverse of the parent. Other logical states are more difficult. A parent 'and' node labelled false will have at least one false child. A parent 'or' node labelled true will have at least one true child node. Using these logical rules, it is possible to find a child node that is true according to one parent node and false according to another parent node; such an inconsistency in the rule set graph identifies a candidate rule set that is inconsistent. If damaged-rule set graph solver 608 does not run into such an inconsistency, but finds a valid labelling, then there is a missing case or a missing decision 660 for the candidate subset of rules, meaning that this subset is insufficient to represent the decision policy of the original rule set. However, if the damaged-rule set graph solver 608 shows that there is no such labelling, then the candidate subset is sufficient to represent this decision policy and all rules outside the candidate subset can definitely be removed from it without changing the behavior of the rule set.

Figure 9:
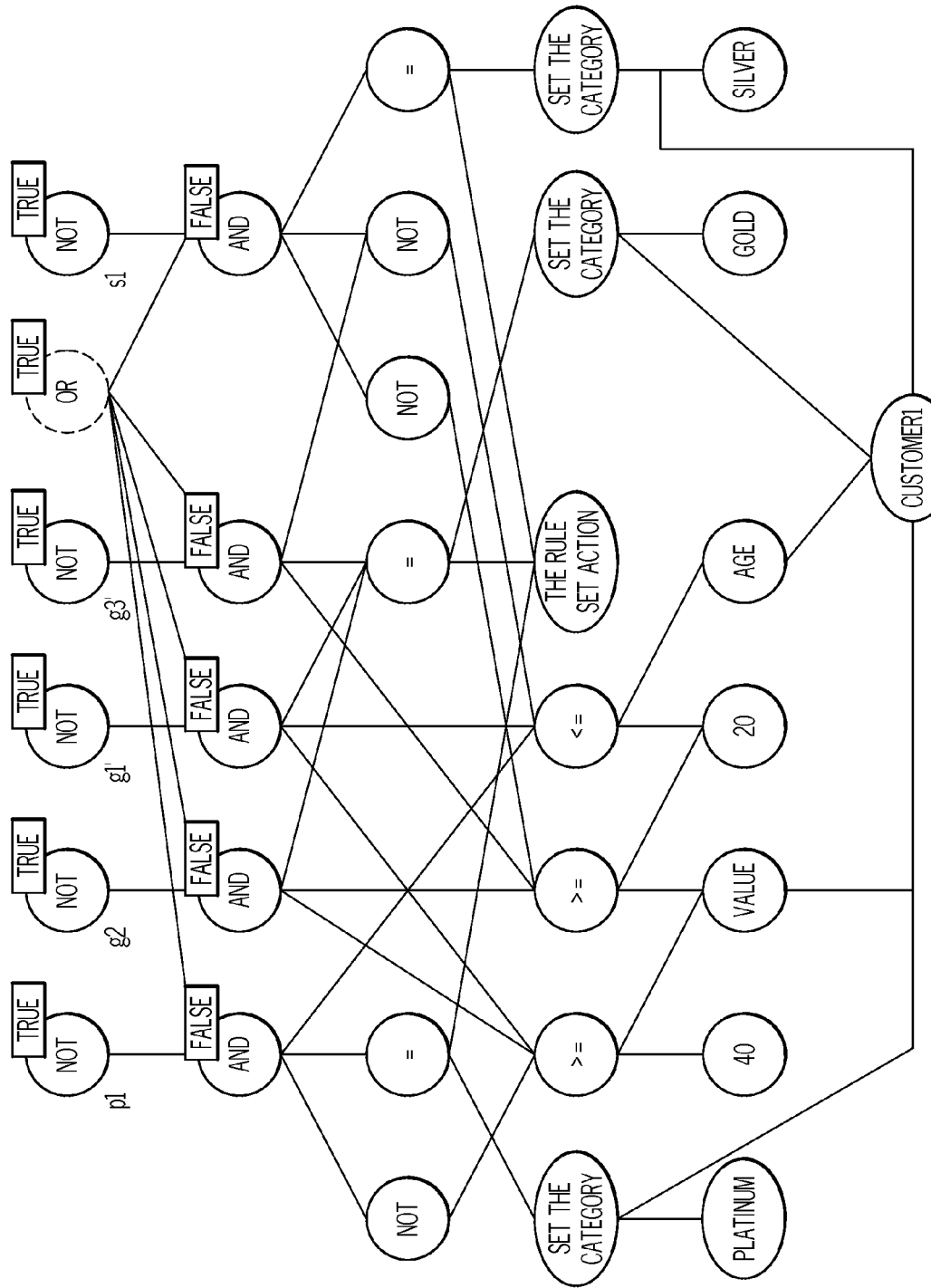
FIG. 9 illustrates a damaged rule set graph for a candidate subset that includes all five rules p1, g2, g1', g3', s1 of example rule project 2 in accordance with an embodiment of the present invention.

FIG. 9 shows a damaged-rule set graph for a candidate subset that includes all rules in accordance with an embodiment of the present invention; this graph illustrates a graph having inconsistent labelling. (FIG. 9 does not show the root node of this damaged-rule set graph for lack of space.) The labelling process firstly labels the root node (a conjunctive 'and' node) of the damaged-rule set graph with 'true.' Secondly, the root nodes of all rule instance violation graphs and of the rule set application graph (all connected to the root node of the damaged-rule set graph) are labelled with 'true' because the root node is a conjunctive 'and' node. If this labelling is extended, then some operation is violated. Thirdly, damaged-rule set graph solver 608 labels the children of the root nodes of the rule instance violation graphs with "false" since these root nodes represent a logical negation. However, the third step of labelling violates the disjunction represented by the root node of the rule set application graph because the 'true' state of the 'or' node is inconsistent with having all child nodes labelled 'false'(see dashed circle true 'or' parent node and five false children nodes). Therefore, this damaged-rule set graph has only inconsistent labelling and demonstrates that this rule set treats the same cases and makes the same decisions as the original rule set.

Figure 10:
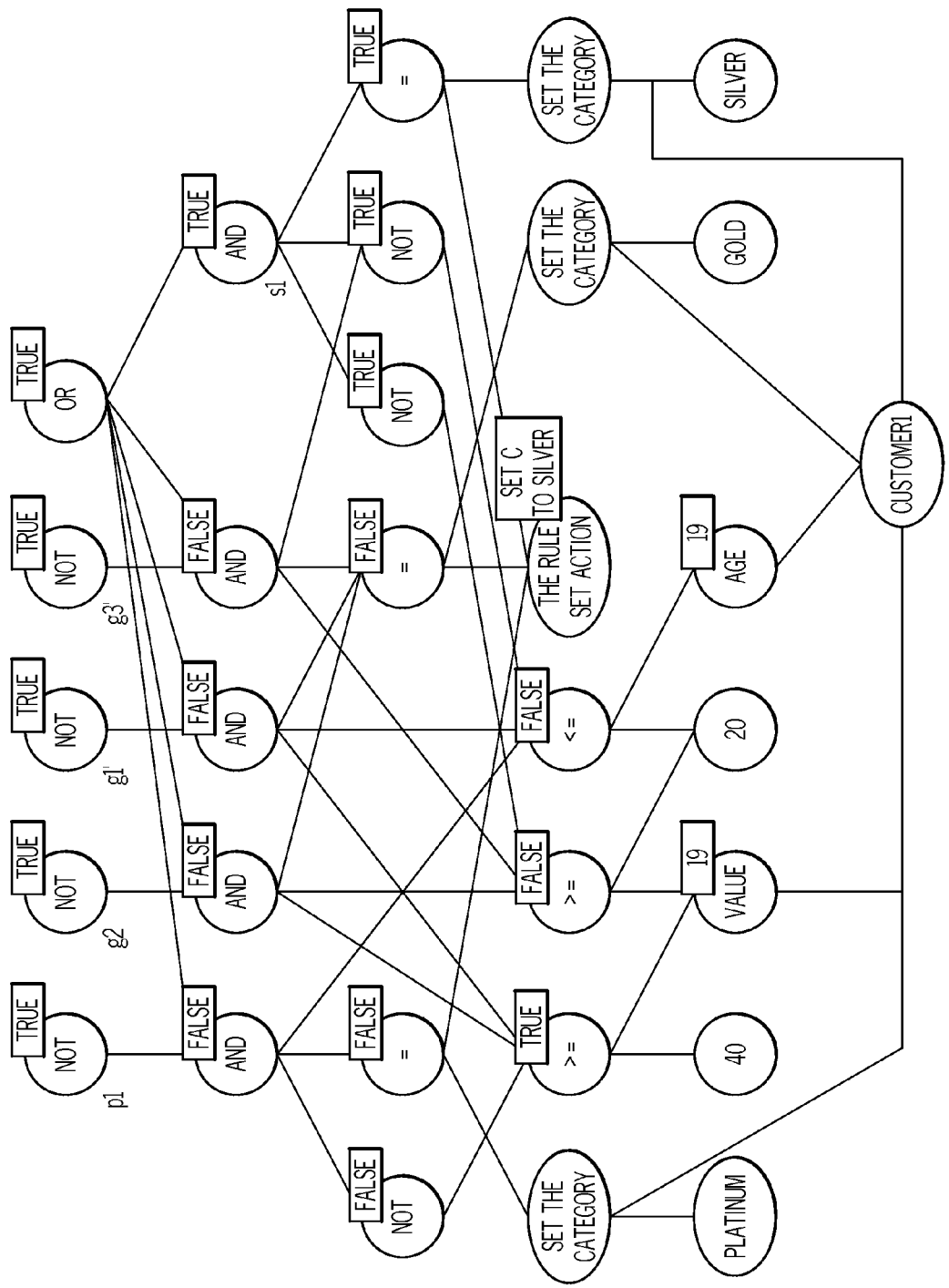
FIG. 10 illustrates a labelled damaged rule set graph for a candidate set of four rules p1, g2, g1', g3' (s1 removed) of example rule project 2 in accordance with an embodiment of the present invention.

When applied to rule project 2 and a rule ordering p1, g2, g1', g3', s1, conflict-set minimizer 406 explores different candidate subsets consisting of the rule violation graphs of selected rules. It first removes the least preferred rule s1 from the rule set and explores the candidate set p1, g2, g1', g3'. FIG. 10 shows the damaged-rule set graph for candidate set p1, g2, g1', g3' (without showing the root node again for convenience) in accordance with an embodiment of the present invention. This graph has consistent labelling, meaning that removing rule s1 damages the rule set and that this rule set does not treat the same cases and does not make the same decisions as the original rule set. Therefore, rule s1 cannot be removed from the rule set.

Figure 11:
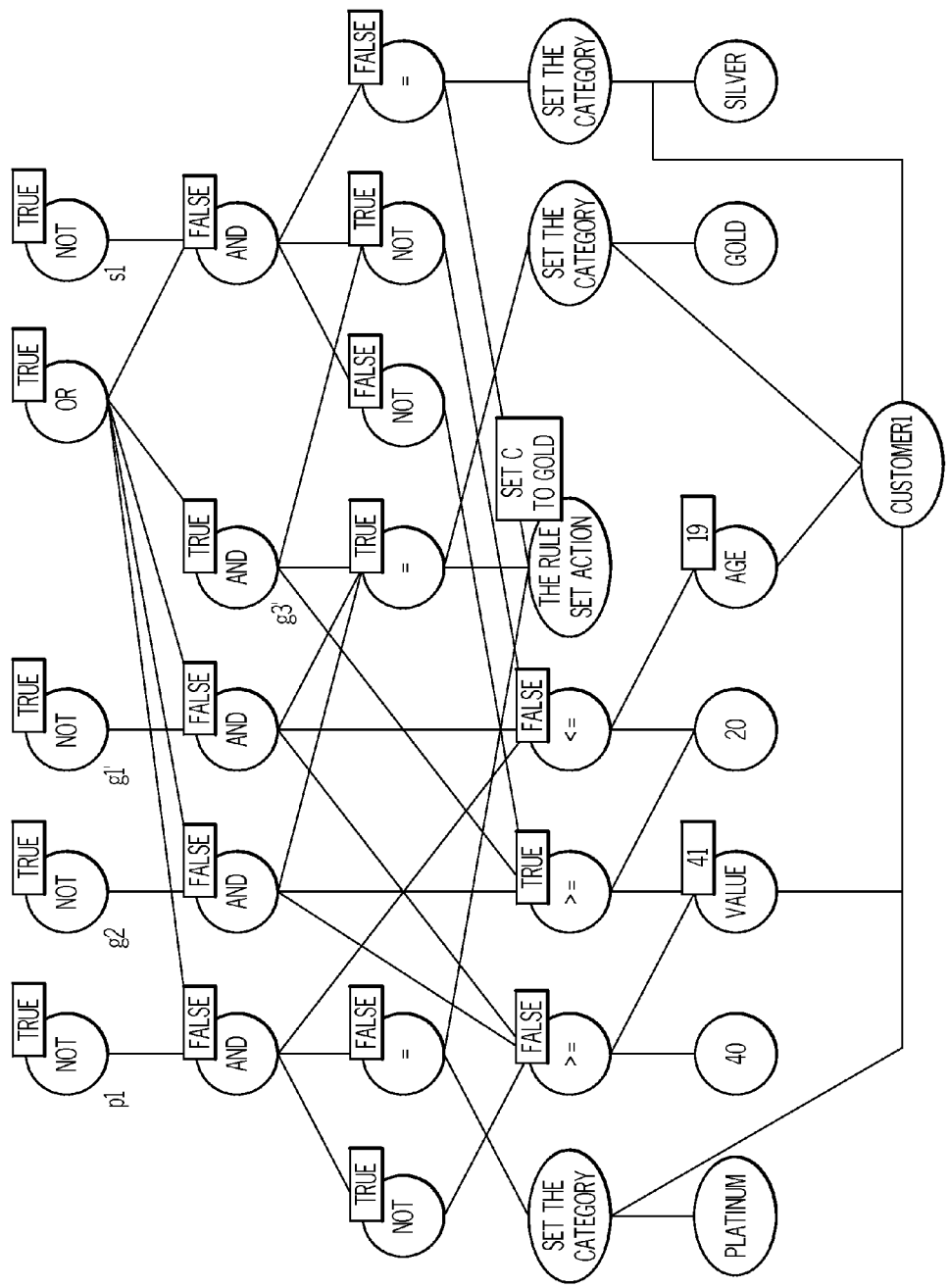
FIG. 11 illustrates a labelled damaged rule set graph for a candidate set of four rules p1, g2, g1', s1 (g3' removed) of example rule project 2 in accordance with an embodiment of the present invention.

Similarly, the tentative removal of rule g3' damages the rule set as the corresponding damaged-rule set graph has consistent labelling as shown in FIG. 11. FIG. 11 illustrates a labelled damaged-rule set graph for a candidate set of four rules p1, g2, g1', s1 (g3' removed) of rule project 2 in accordance with an embodiment of the present invention. This rule set does not treat the same cases and does not make the same decisions as the original rule set. Therefore, rule g3' cannot be removed from the rule set.

Next, conflict-set minimizer 406 tentatively removes rule g1' (not shown in Figures). Again the resulting damaged-rule set graph has consistent labelling meaning that g1' can not be removed and the rule set p1, g2, g3', s1 does not treat the same cases and does not make the same decisions as the original rule set.

Figure 12:
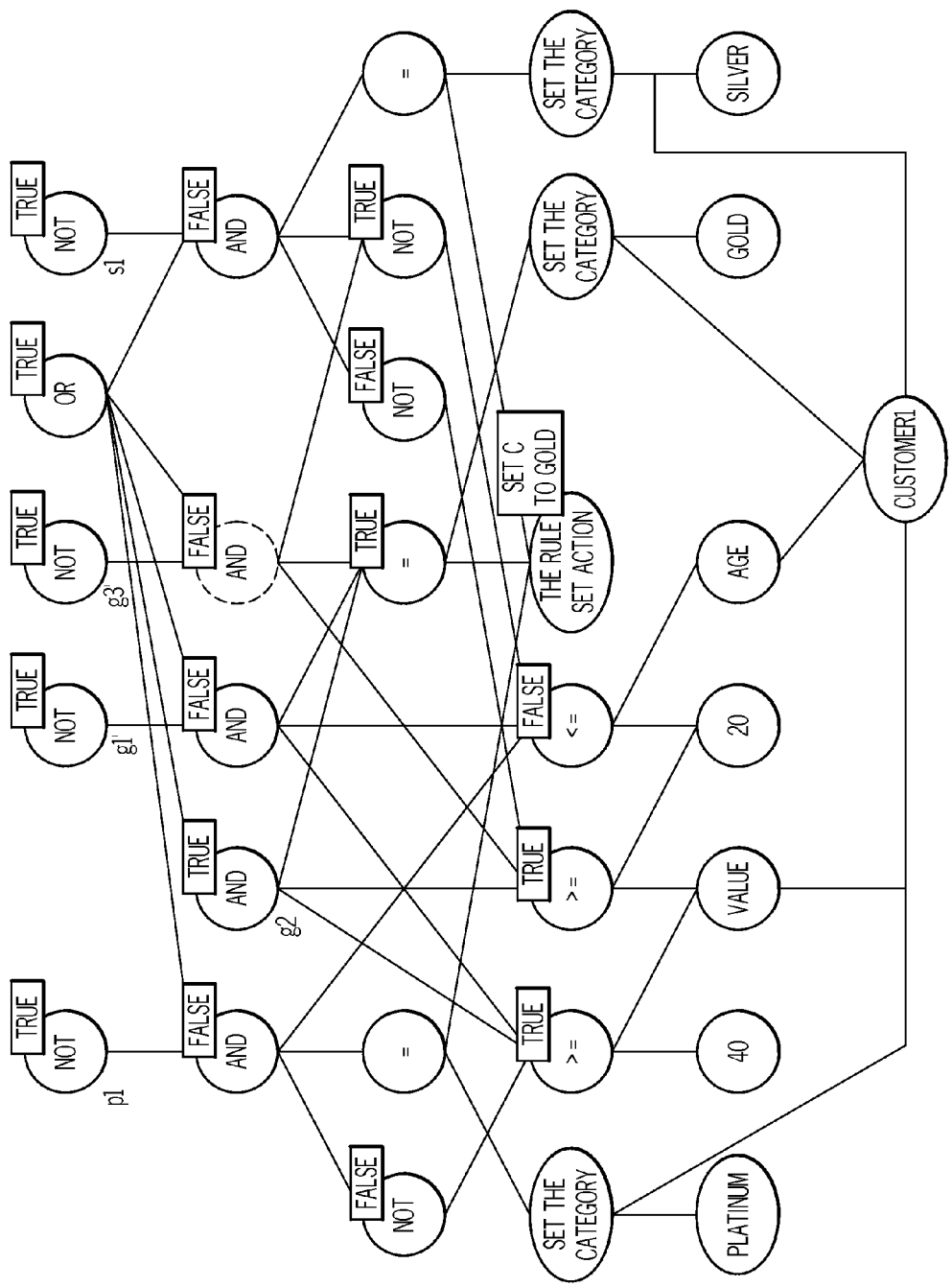
FIG. 12 illustrates a labelled damaged rule set for a candidate rule set of four rules p1, g1', g3', s1 (g2 removed) in accordance with an embodiment of the present invention.

FIG. 12 illustrates a labelled damaged-rule set graph 658 (FIG. 6) of candidate rule set p1, g1', g3', s1 (g2 removed) and a damaged-rule set graph which has inconsistent labelling (see the dotted circle false 'and' node with three 'true' children) in accordance with an embodiment of the present invention. Rule g2 is therefore redundant and can be removed. The conflict-set minimizer 406 (FIG. 4) thus reduces the rule set to p1, g1', g3', s1. Therefore, this damaged-rule set graph has only inconsistent labelling and demonstrates that this rule set treats the same cases and makes the same decisions as the original rule set.

Referring to FIGS. 4, 6 and 12, in a final step, rule p1 is removed. The candidate rule set g2, g1', g3', s1 has a damaged-rule set graph (not shown) which can be successfully labelled. Therefore, rule p1 cannot be removed.

Conflict-set minimizer 406 therefore returns the rule violation graphs of the rules p1, g1', g3', s1 from the damaged-rule set graph of FIG. 12.

Rule extractor 410 extracts the rules and returns p1, g1', g3', s1 as the redundancy-free rule set that represents the same decision policy as the original rule set 2.

If the damaged-rule set graph solver 608 runs into a timeout, then it is not able to show whether the current candidate set is damaged or not. As the damaged-rule set solver 608 is not sure that this tentatively reduced rule set represents the decision policy, it handles it as a damaged rule set, meaning that it rejects the candidate set even if its damaged rule set graph has no labelling. Therefore, time-outs can thus lead to non-minimal reductions of the original rule set, but do not prevent the redundancy eliminator from removing redundant rules.

Although the example of rule set 2 has a single redundancy-free policy-preserving subset, other rule sets such as rule set 3 have multiple redundancy-free policy-preserving subsets. Conflict-set minimizer 406 would then choose one of these subsets depending on the preferences between the rules which influence the rule ordering. For example, it will return the subset s1, g1, g3, g5, p1 if it uses the rule ordering s1, p1, g2, g1, g5, g3, g4, g6. As all rules are redundant in this rule set, the conflict-set minimizer 406 will first remove the least preferred rule, namely, rule g6. Similarly, it will remove rule g4. However, rules g1, g5, g3 are not redundant in the reduced set s1, p1, g2, g1, g5, g3 and will not be removed. Conflict-set minimizer 406 will further remove g2 and keep s1 and p1. The redundancy eliminator 400 returns the subset s1, p1, g1, g5, g3 as the preferred redundancy-free subset that represents the same decision policy as rule set 3.

As the rule sets 2 and 3 are very small, conflict-set minimizer 406 will best perform an iterative minimization approach as elaborated above. For large rule sets that contain many redundant rules, conflict-set minimizer 406 will split those sets in the middle and divide the redundancy elimination problems in two subproblems of same size. It repeats this approach until subproblems of small sizes are obtained that it better minimizes by an iterative approach. Patent application "Method and System for Detecting Missing Rules with Most-General Conditions" describes this conflict-set minimization strategy in detail. For redundancy elimination, this strategy is interesting if a rule set contains many redundant rules. This may in particular happen if rules are assembled from different sources and written by different rule authors. The redundancy eliminator 400 of this disclosure therefore provides new perspectives for redundancy elimination in projects of this kind.

Figure 13:
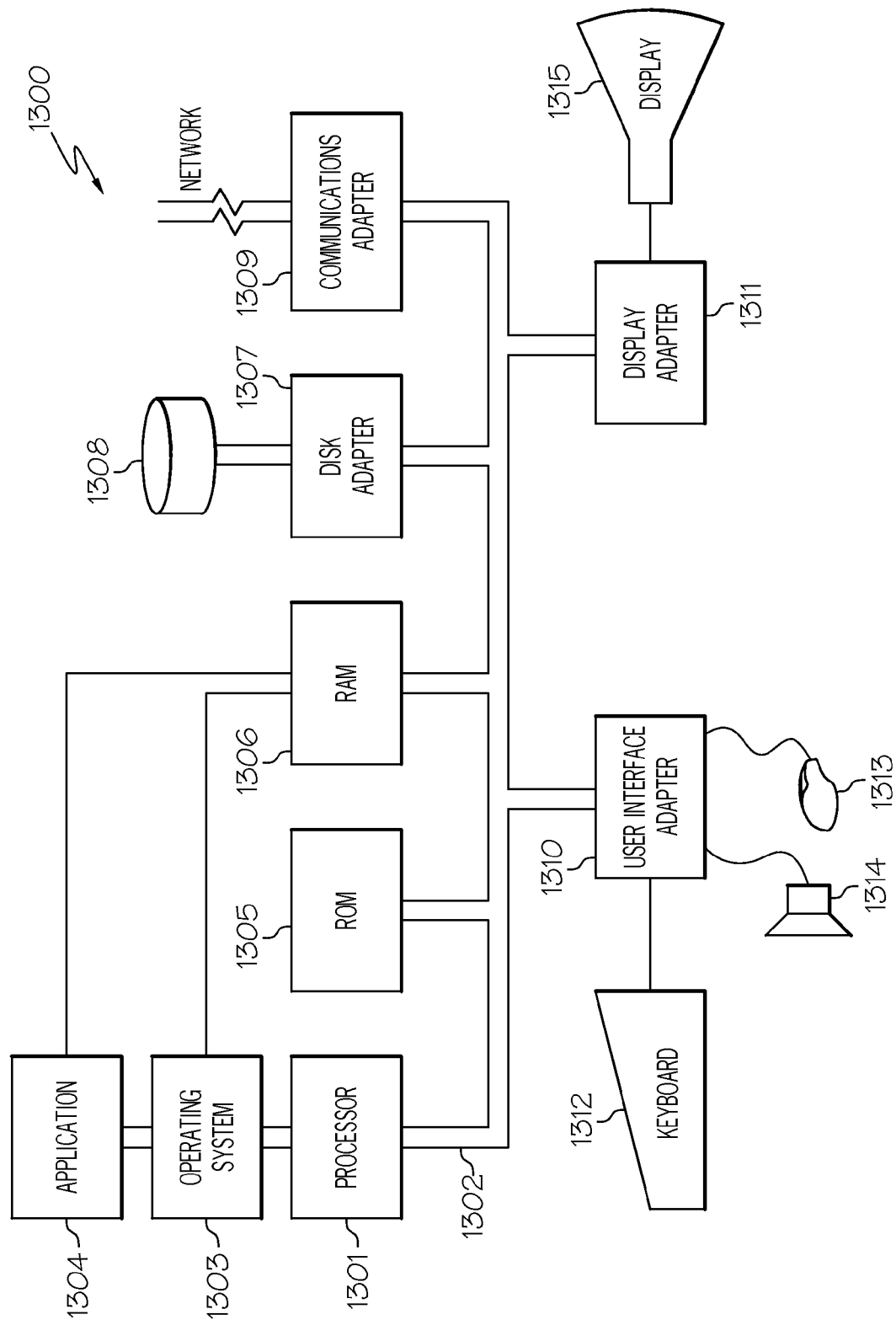
FIG. 13 depicts an embodiment of a hardware configuration of a computer system which is representative of a hardware environment for practicing the present invention.

FIG. 13 depicts an embodiment of a hardware configuration of a computer system 1300 which is representative of a hardware environment for practicing the present invention. Referring to FIG. 13, computer system 1300 has a processor 1301 coupled to various other components by system bus 1302. An operating system 1303 may run on processor 1301 and provide control and coordinate the functions of the various components of FIG. 13. An application 1304 in accordance with the principles of the present invention may run in conjunction with operating system 1303 and provide calls to operating system 1303 where the calls implement the various functions or services to be performed by application 1304. Application 1304 may include, for example, an application for minimizing rule sets in a rule management system as discussed above.

Referring again to FIG. 13, read-only memory ("ROM") 1305 may be coupled to system bus 1302 and include a basic input/output system ("BIOS") that controls certain basic functions of computer system 1300. Random access memory ("RAM") 1306 and disk adapter 1307 may also be coupled to system bus 1302. It should be noted that software components including operating system 1303 and application 1304 may be loaded into RAM 1306, which may be computer system's 1300 main memory for execution. Disk adapter 1307 may be an integrated drive electronics ("IDE") adapter that communicates with a disk unit 1308, e.g., disk drive.

Computer system 1300 may further include a communications adapter 1309 coupled to bus 1302. Communications adapter 1309 may interconnect bus 1302 with an outside network thereby allowing computer system 1300 to communicate with other similar devices.

I/O devices may also be connected to computer system 1300 via a user interface adapter 1310 and a display adapter 1311. Keyboard 1312, mouse 1313 and speaker 1314 may all be interconnected to bus 1302 through user interface adapter 1310. A display monitor 1315 may be connected to system bus 1302 by display adapter 1311. In this manner, a user is capable of inputting to computer system 1300 through keyboard 1312 or mouse 1313 and receiving output from computer system 1300 via display 1315 or speaker 1314.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for minimizing a rule set, the method comprising:
    building a rule set application graph that describes a set of rules including actions and cases, whereby each rule defines an action for one or more cases;
    building a rule violation graph for each rule describing the actions and cases not defined for that rule; and
    determining, by a processor, a subset of rules having a reduced number of rules with a same set of actions and cases as the rule set application graph by exploring candidate subsets of the set of rules that are sufficient for reproducing a behavior of an original rule set.

2. The method as recited in claim 1, wherein said determining step comprises:
    building rule violation graph candidate subsets from the rule violation graphs comprising the actions and cases not defined for that subset of rules and further determining if those actions and cases not defined by each rule violation graph candidate subset are distinct from the actions and cases defined by the rule set application graph.

3. The method as recited in claim 2 further comprising:
    determining more than one valid reduced subset of rules and using preferences between rules to choose a preferred valid reduced subset of rules.

4. The method as recited in claim 2, wherein said determining if those actions and cases not defined by each rule violation graph candidate subset are distinct from the actions and cases defined by the rule set application graph comprises:
    building respective damaged rule set graphs by joining the rule set application graph and the respective rule set violation graph candidate subsets; and
    testing each damaged rule set graph for logical consistency.

5. The method as recited in claim 4, whereby a set of rules can define more than one object, wherein said building a damaged rule set graph comprises building damaged rule set graph instances for each object defined by the set of rules.

6. The method as recited in claim 1 further comprising:
    identifying rules whereby the action of the rule is independent of the case of the rule; and
    ignoring the identified actions in the rule application graph and the rule violation graph.

7. A computer program product embodied in a non-transitory computer readable storage medium for minimizing a rule set, the computer program product comprising the programming instructions for: building a rule set application graph that describes a set of rules including actions and cases, whereby each rule defines an action for one or more cases; building a rule violation graph for each rule describing the actions and cases not defined for that rule; and determining a subset of rules having a reduced number of rules with a same set of actions and cases as the rule set application graph by exploring candidate subsets of the set of rules that are sufficient for reproducing a behavior of an original rule set.

8. The computer program product as recited in claim 7, wherein the programming instructions for determining comprises the programming instructions for:
    building rule violation graph candidate subsets from the rule violation graphs comprising the actions and cases not defined for that subset of rules and further determining if those actions and cases not defined by each rule violation graph candidate subset are distinct from the actions and cases defined by the rule set application graph.

9. The computer program product as recited in claim 8 further comprising the programming instructions for:
  determining more than one valid reduced subset of rules and using preferences between rules to choose a preferred valid reduced subset of rules.

10. The computer program product as recited in claim 8, wherein the programming instructions for determining if those actions and cases not defined by each rule violation graph candidate subset are distinct from the actions and cases defined by the rule set application graph comprises the programming instructions for:
  building respective damaged rule set graphs by joining the rule set application graph and the respective rule set violation graph candidate subsets; and
  testing each damaged rule set graph for logical consistency.

11. The computer program product as recited in claim 10, whereby a set of rules can define more than one object, wherein said building a damaged rule set graph comprises building damaged rule set graph instances for each object defined by the set of rules.

12. The computer program product as recited in claim 7 further comprising the programming instructions for:
  identifying rules whereby the action of the rule is independent of the case of the rule; and
  ignoring the identified actions in the rule application graph and the rule violation graph.

13. A system, comprising:
  a memory unit for storing a computer program for minimizing a rule set; and
  a processor coupled to the memory unit, wherein the processor, responsive to the computer program, comprises:
    circuitry for building a rule set application graph that describes a set of rules including actions and cases, whereby each rule defines an action for one or more cases;
    circuitry for building a rule violation graph for each rule describing the actions and cases not defined for that rule; and
    circuitry for determining a subset of rules having a reduced number of rules with a same set of actions and cases as the rule set application graph by exploring candidate subsets of the set of rules that are sufficient for reproducing a behavior of an original rule set.

14. The system as recited in claim 13, wherein the circuitry for determining comprises:
  circuitry for building rule violation graph candidate subsets from the rule violation graphs comprising the actions and cases not defined for that subset of rules and further determining if those actions and cases not defined by each rule violation graph candidate subset are distinct from the actions and cases defined by the rule set application graph.

15. The system as recited in claim 14, wherein the processor further comprises:
  circuitry for determining more than one valid reduced subset of rules and using preferences between rules to choose a preferred valid reduced subset of rules.

16. The system as recited in claim 14, wherein the circuitry for determining if those actions and cases not defined by each rule violation graph candidate subset are distinct from the actions and cases defined by the rule set application graph comprises:
  circuitry for building respective damaged rule set graphs by joining the rule set application graph and the respective rule set violation graph candidate subsets; and
  circuitry for testing each damaged rule set graph for logical consistency.

17. The system as recited in claim 16, whereby a set of rules can define more than one object, wherein said building a damaged rule set graph comprises building damaged rule set graph instances for each object defined by the set of rules.

18. The system as recited in claim 13, wherein the processor further comprises:
  circuitry for identifying rules whereby the action of the rule is independent of the case of the rule; and
  circuitry for ignoring the identified actions in the rule application graph and the rule violation graph.

19. The system as recited in claim 13, wherein the system is a business rules management system.

\* \* \* \* \*